US008711813B2

(12) United States Patent
Yokoyama

(10) Patent No.: US 8,711,813 B2
(45) Date of Patent: Apr. 29, 2014

(54) BASE STATION DEVICE AND WIRELESS COMMUNICATION METHOD

(75) Inventor: Hitoshi Yokoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1025 days.

(21) Appl. No.: 12/419,630

(22) Filed: Apr. 7, 2009

(65) Prior Publication Data

US 2009/0190561 A1 Jul. 30, 2009

Related U.S. Application Data

(63) Continuation of application No. PCT/JP2006/323965, filed on Nov. 30, 2006.

(51) Int. Cl.
*H04B 7/216* (2006.01)

(52) U.S. Cl.
USPC ............................ 370/335; 455/522; 455/561

(58) Field of Classification Search
USPC ........................... 370/335, 331, 332; 455/509
See application file for complete search history.

(56) References Cited

U.S. PATENT DOCUMENTS

| | | | | |
|---|---|---|---|---|
| 6,360,076 | B1 | 3/2002 | Segura et al. | |
| 6,363,257 | B1 * | 3/2002 | Warwick | 455/511 |
| 7,502,593 | B2 * | 3/2009 | Shinoi | 455/67.11 |
| 2002/0173312 | A1 | 11/2002 | Takano et al. | |
| 2003/0112744 | A1 | 6/2003 | Baum et al. | |
| 2004/0072565 | A1 | 4/2004 | Nobukiyo et al. | |
| 2006/0063543 | A1 | 3/2006 | Matoba et al. | |
| 2006/0166665 | A1 | 7/2006 | Shinoi | |
| 2007/0060188 | A1 * | 3/2007 | Cho | 455/522 |
| 2008/0051129 | A1 | 2/2008 | Abe et al. | |
| 2011/0281605 | A1 * | 11/2011 | Shiizaki et al. | 455/509 |

FOREIGN PATENT DOCUMENTS

| | | |
|---|---|---|
| JP | 2003-037554 | 2/2003 |
| JP | 2003-511925 | 3/2003 |
| JP | 2004-072157 | 3/2004 |
| JP | 2004-200856 | 7/2004 |
| JP | 2004-328521 | 11/2004 |
| JP | 2006-094005 | 4/2006 |
| WO | 2005/122414 | 12/2005 |

OTHER PUBLICATIONS

International Preliminary Report and Written Opinion of the International Searching Authority on patentability of corresponding International Patent Application No. PCT/2006/323965; Dated Jun. 3, 2009.

International Search Report and Written Opinion for International PCT Application No. PCT/JP2006/323965, dated Feb. 21, 2007.

The extended European search report, the supplementary European search report and the European search opinion issued for corresponding European Application No. 06833768.2, dated Nov. 30, 2012.

* cited by examiner

*Primary Examiner* — Kevin C Harper
*Assistant Examiner* — Henry Baron
(74) *Attorney, Agent, or Firm* — Myers Wolin, LLC

(57) ABSTRACT

A base station device and a mobile terminal for improving frequency-utilization efficiency to realize high-speed communication. The base station device forming a cell and performing radio communication with the mobile terminal being present in the cell includes determining unit configured to determine the application of adaptive demodulation and coding only to the radio communication with the mobile terminal present in a part of a predetermined area in the cell and an estimating unit configured to estimate channel state information on the basis of the pilot signal from the mobile terminal, wherein the determining unit determines whether or not the adaptive demodulation and coding is applied to the radio communication with the mobile terminal on the basis of the channel state information estimated by the estimating unit.

1 Claim, 23 Drawing Sheets

*FIG. 3*

| CQI | CONVENTIONAL METHOD | PROPOSED TECHNIQUE |
| --- | --- | --- |
| 0 | 16QAM R=1 | 16QAM R=1 |
| 1 | 16QAM R=8/9 | 16QAM R=8/9 |
| 2 | 16QAM R=6/7 | 16QAM R=6/7 |
| 3 | · | · · · |
| ·<br>·<br>· | ·<br>·<br>· | ·<br>·<br>· |
| 31 | QPSK R=1/3 | QPSK R=1/3 |
| 32 | · | × |
| ·<br>·<br>· | ·<br>·<br>· | ×<br>×<br>× |
| 63 | BPSK R=1/5 Repetition=16 | × |

*FIG. 22*

| CQI | FIRST EMBODIMENT | SECOND EMBODIMENT | |
|---|---|---|---|
| 0 | 16QAM R=1 | 2Stream MIMO 16QAM R=1 | MIMO |
| 1 | 16QAM R=8/9 | 2Stream MIMO 16QAM R=8/9 | |
| 2 | 16QAM R=6/7 | 2Stream MIMO 16QAM R=6/7 | |
| 3 | · · · | · · · | |
| ·<br>· | ·<br>· | ·<br>· | |
| 15 | · · · | 2Stream MIMO QPSK R=1/3 | |
| 16 | · · · | 16QAM R=1 | |
| 17 | · · · | 16QAM R=8/9 | |
| 18 | · · · | 16QAM R=6/7 | |
| 19 | · · · | · · · | |
| ·<br>· | ·<br>· | ·<br>· | |
| 31 | QPSK R=1/3 | QPSK R=1/3 | |
| 32 | × | × | |
| 33 | × | × | |
| ·<br>·<br>· | ×<br>×<br>× | ×<br>×<br>× | |

BASE STATION DEVICE AND WIRELESS COMMUNICATION METHOD

CROSS-REFERENCE TO RELATED APPLICATIONS

This application is a continuation of International Application PCT/JP2006/323965, filed on Nov. 30, 2006, now pending, the contents of which are herein wholly incorporated by reference.

FIELD

The present invention relates generally to a base station device and a mobile terminal, and more particularly to a technique of switching over a wireless communication method within a cell configured by the base station device.

BACKGROUND

A mobile communication system employing a W-CDMA (Wideband Code Division Multiple Access) method adopts a frequency re-use scheme using the same frequency band among cells in order to improve frequency-utilization efficiency. This type of frequency allocation has great interference with neighboring cells, and a communication environment is largely different depending on user's location within the cell. Such being the case, this type of mobile communication system has a case in which transmit power control (TPC (Transmit Power Control)) is applied.

The transmit power control involves controlling reception power of the signal from each mobile terminal in the base station so that the reception power gets fixed by transmitting and receiving control information (TPC control bits) corresponding to an SIR (Signal to Interference Ratio) value calculated based on a pilot symbol between the base station and the mobile terminal.

The transmit power control is classified into inner loop control and outer loop control. The inner loop control is such that a TPC control bit value is obtained by comparing an SIR target value with an SIR measurement value calculated from the pilot symbol transmitted from a transmitting station, and the transmitting station controls the power of the transmission signal, corresponding to the TPC control bit value. The outer loop control is such that the SIR target value is updated with a proper value at a predetermined cycle through communications between an RNC (Radio Network Controller) and the base station.

On the other hand, in the mobile communication system using the W-CDMA method, an examination of adopting an adaptive modulation and coding (AMC (Adaptive Modulation and Coding)) method of dynamically selecting a communication-enabled coding and modulation method corresponding to a communication environment for actualizing faster communications, is underway. In the mobile communication system using the AMC method, the AMC corresponding to the communication environment of a location where the mobile terminal is present is executed even in such a case that the mobile terminal is present in whichever location within the cell. Accordingly, the control information necessary for executing the AMC needs surely transmitting to a cell edge. Further, a modulation and coding scheme (MCS: Modulation and Coding Scheme) set of the AMC needs preparing so as to be communication-enabled also at the cell edge.

FIG. 24 is a diagram illustrating a communication sequence for executing the AMC between a mobile terminal

2110 and a base station 2111. In FIG. 24, to begin with, the mobile terminal 2110 transmits a pilot signal to the base station 2111 (S2101). The base station 2111 estimates a channel status (e.g., an SINR (Signal-to-Interference and Noise power Ratio) value) based on the pilot signal. The base station 2111 transmits the SINR to the mobile terminal 2110 (S2102). At this time, the base station 2111 transmits scheduling information together for the mobile terminal 2110, which is determined based on the SINR.

The mobile terminal 2110 does not transmit a user data packet till its transmission is permitted by the scheduling information. The mobile terminal 2110, when the transmission is permitted, determines a modulation format (a coding and modulation method) corresponding to the communication environment of the self-terminal in a way that takes account of the SINR value, amount of a packet information etc contained in a transmission queue. The mobile terminal 2110 notifies the base station 2111 of the modulation format (S2103), and transmits the packet signal to which the thus-determined modulation format is applied (S2104). The base station 2111 sends "ACK" or "NACK" as a response to the mobile terminal 2110, corresponding to a reception status of the packet signal to which the modulation format is applied (S2105). Note that FIG. 24 illustrates a communication sequence related to an uplink to the base station from the mobile terminal, however, the same communication sequence related to a downlink to the mobile terminal from the base station is also executed.

By the way, in the communication sequence shown in FIG. 24, the information transmitted in S2102 and S2103 becomes control information for the AMC. Accordingly, in the case of employing the AMC method, this type of control information for the AMC needs transmitting and receiving via both of the uplink and the downlink.

Moreover, it is required that the control information for the AMC is surely transmitted up to the cell edge, and hence a gain of the control information signal is increased by applying "Repetition" and "Spreading" to the control information data. FIG. 25 is a diagram illustrating a communication method for the control information for the AMC and illustrates an example in which Repetition=16 is applied for assuring characteristics at the cell edge, and an 80-bit area is ensured as a communication field for the control information. According to this example, the control bits are allocated in [CB] areas of the communication field of the control information, and repetition data of the control information bits set in the [CB] areas are allocated in [CB(R)] areas adjacent to the [CB] areas on the right sides. Namely, according to the example in FIG. 25, 5-bit control information can be transmitted by using 80-bit control information communication field. Thus, there is a possibility of ensuring the control information communication field at substantially the same rate as that of the communication are ensured for the data communications.

For others, there are the following documents as documents that disclose the prior arts related to the invention of the present application.

[Patent document 1] Japanese Patent Laid-Open Publication No. 2004-72157

[Patent document 2] Japanese Patent Laid-Open Publication No. 2003-37554

SUMMARY

As described above, the conventional mobile communication system using the AMC method aims at optimizing the data communications but includes a problem that the communication field for the user data is compressed because of surely transmitting the control information for the AMC up to the vicinity of the cell edge. This problem is easy to arise when sensitively executing the packet scheduling and the AMC on a short-time resource block basis in a narrow band where fluctuations on the propagation path are substantially the same, and is therefore an inevitable problem in the future.

It is an object of the present invention to provide a base station device and a mobile terminal that actualize fast communications by improving frequency-utilization efficiency.

The present invention adopts the following configurations in order to solve the problems given above. Namely, the present invention relates to a base station device forming a cell and performing wireless communication with a mobile terminal present in the cell, wherein the base station device includes a determining unit configured to determine application of adaptive modulation and coding to only the wireless communication with the mobile terminal present in a predetermined area of a part of the cell.

For realizing this configuration, the base station device may further includes an estimating unit configured to estimate channel status information based on a pilot signal from the mobile terminal, wherein the determining unit may determine whether or not the adaptive modulation and coding is applied to the wireless communication with the mobile terminal based on the channel status information estimated by the estimating unit. For example, if the adaptive modulation and coding is not applied to the mobile terminal of which the channel status is poor (which is the mobile terminal residing in the vicinity of the cell edge), resulting in determination of the application of the adaptive modulation and coding to only the wireless communication with the mobile terminal present in the predetermined area of a part of the cell.

This configuration being adopted, the base station device can further include a control signal generating unit configured to make redundancy of control information used for the adaptive modulation and coding smaller than redundancy of other control information. The redundancy is exemplified by the number of a repetition of target information, a spreading rate, a coding rate, etc.

This scheme enables the frequency-utilization efficiency of the user data to be increased by decreasing the redundancy of the control information and, by extension, a communication throughput to be improved.

Further, the base station device may further include a format changing unit configured to change, if the determining unit does not determine the application of the adaptive modulation and coding, a format to a communication format in which user data is allocated in place of the control information used for the adaptive modulation and coding.

This configuration enables an information amount of the control information itself to be further reduced and therefore the frequency-utilization efficiency of the user data to be further increased.

Further, the determining unit may have a MCS (Modulation and Coding Scheme) Set corresponding to the channel status information and may, if the channel status information estimated by the estimating unit corresponds to a valid value of the MCS Set, determine that the adaptive modulation and coding is applied to the wireless communications with the mobile terminal.

According to the present invention, the adaptive modulation and coding is applied to the predetermined area of a part of the cell, hence the effective range of the MCS Set can be set narrower than in the case of being applied to the entire area of the cell. Namely, it is feasible to reduce the information amount of the channel status information itself held by the base station device itself or of which the mobile terminal is notified.

This scheme enables amount of the information of the control information itself to be further decreased and therefore the frequency-utilization efficiency of the user data to be further increased.

In the case of adopting this scheme, the determining unit may further include a changing unit configured to change a range of a valid value of the MCS Set.

The area to which the adaptive modulation and coding is applied can be thereby adaptively adjusted corresponding to the communication environment where the base station device is located and can be thereby properly set.

Moreover, the base station device may further include an error determining unit configured to determine an error of data received from the mobile terminal and a recording unit configured to sequentially record a result of the error determination, which is made by the error determining unit, with respect to each of the mobile terminals, wherein the determining unit may determine whether or not the adaptive modulation and coding is applied to the wireless communication with the mobile terminal based on statistics taken about the mobile terminal depending on the result of the error determination that is recorded by the recording unit.

Furthermore, the determining mean may determine the application of the transmit power control to the wireless communication with the mobile terminal present in a cell area outside the predetermined area.

With this scheme, the transmit power control has a less amount of control information than by the adaptive modulation and coding method, and therefore it does not happen that the wireless resources for the user data are compressed even when taking the redundancy of the control information into consideration in order to cover up to the vicinity of the cell edge.

Accordingly, in the area to which the transmit power control is applied, the transmission power can be reduced while further ensuring the fixed communication rate with improving the frequency-utilization efficiency by deleting the control information for the adaptive modulation and coding. Moreover, the quantity of interference with the neighboring cells can be reduced.

The present invention can be realized as a mobile terminal performing the wireless communication with the base station device according to the present invention discussed above, a mobile communication system including the base station device and the mobile terminal, a program for making an information processing device (computer) function as the base station device according to the present invention or the mobile terminal, or a recording medium recorded with the program.

According to the present invention, it is possible to provide the base station device and the mobile terminal that improve the frequency-utilization efficiency to actualize fast communications.

BRIEF DESCRIPTION OF THE DRAWINGS

FIG. 3 is a diagram illustrating a mapping table between a CQI value and a MCS Set in the case that the CQI value is used for SINR notification;

FIG. 22 is a diagram illustrating a mapping table between the CQI value and the MCS Set in the second embodiment;

DESCRIPTION OF EMBODIMENTS

A mobile communication system in each of embodiments of the present invention will hereinafter be described with reference to the drawings. Note that configurations in the following embodiments which will hereinafter be described are exemplifications, and the present invention is not limited to the configurations in the following embodiments.

[First Embodiment]

A mobile communication system in a first embodiment of the present invention will hereinafter be described.

[System Architecture]

Figure 1:
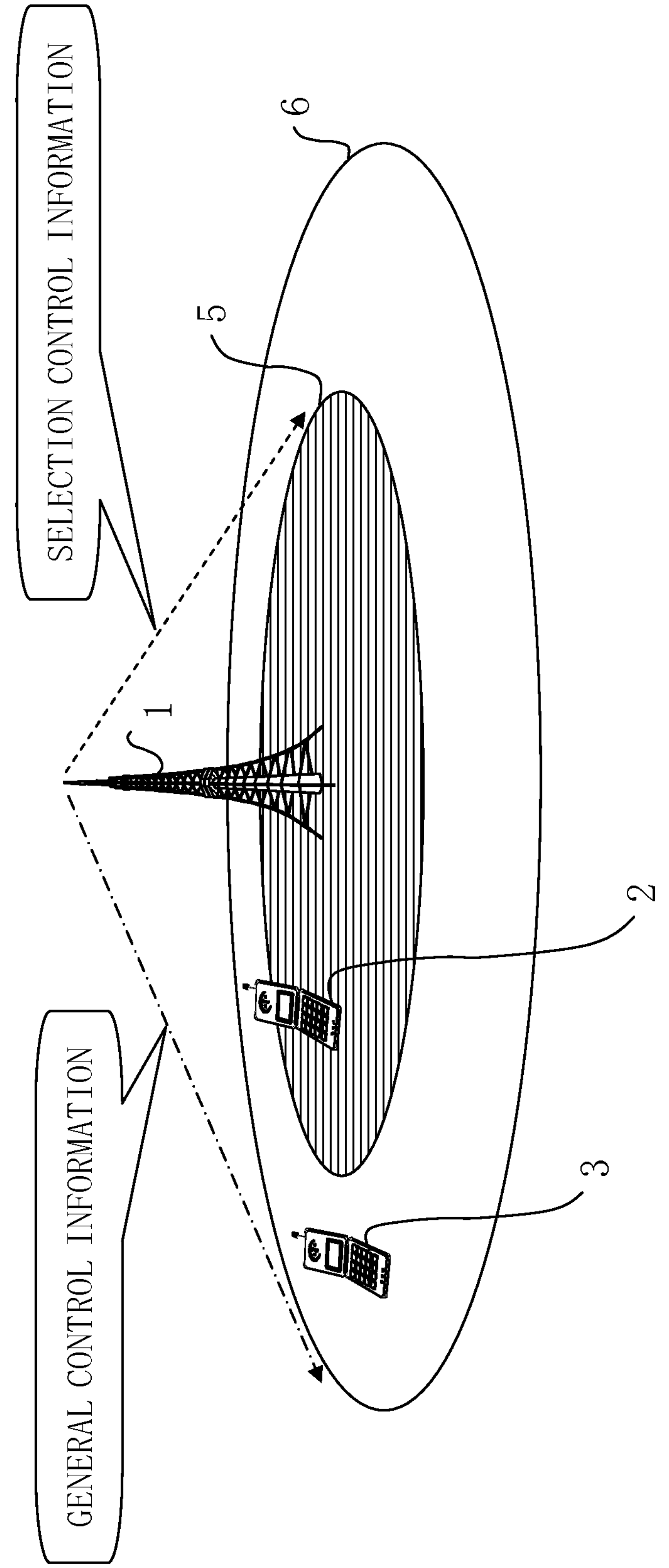
FIG. 1 is a diagram illustrating a system architecture of a mobile communication system in a first embodiment.

To start with, a system architecture of the mobile communication system in the first embodiment will hereinafter be described with reference to FIG. 1. FIG. 1 is a block diagram illustrating the system architecture of the mobile communication system in the first embodiment. The mobile communication system in the first embodiment is configured by connecting a plurality of base stations (e.g., a base station 1 illustrated in FIG. 1) via networks (unillustrated). Mobile terminals 2 and 3 such as mobile phones perform wireless communications with the closest base station 1 and are thereby connected to the mobile communication system in the first embodiment, whereby the mobile terminals are provided with communication services such as a phone call service.

[Principle of First Embodiment]

Before discussion on an in-depth function of each of devices configuring the mobile communication system in the first embodiment, to begin with, a concept of a communication method executed in the mobile communication system in the first embodiment will be explained.

The base station 1 provides, as illustrated in FIG. 1, an area 5 to which an AMC is applied (which will hereinafter be referred to as an AMC area) and an area 6 to which a TPC is applied (which will hereinafter be termed a TPC area) within a cell formed by the base station 1 itself. The communications between the mobile terminal 2 present in the AMC area 5 and the base station 1 involve utilizing the AMC, while the communications between the mobile terminal 3 present in the TPC area 6 and the base station 1 involve utilizing the TPC.

The base station 1 utilizes an dedicated control channel in a way that distinguishes between a selection control information channels in which control information for the AMC and the TPC (which will hereinafter be also referred to as selection control information) is allocated and a general control information channel in which the other control information (which will hereinafter be also termed general control information) are allocated.

Figure 2:
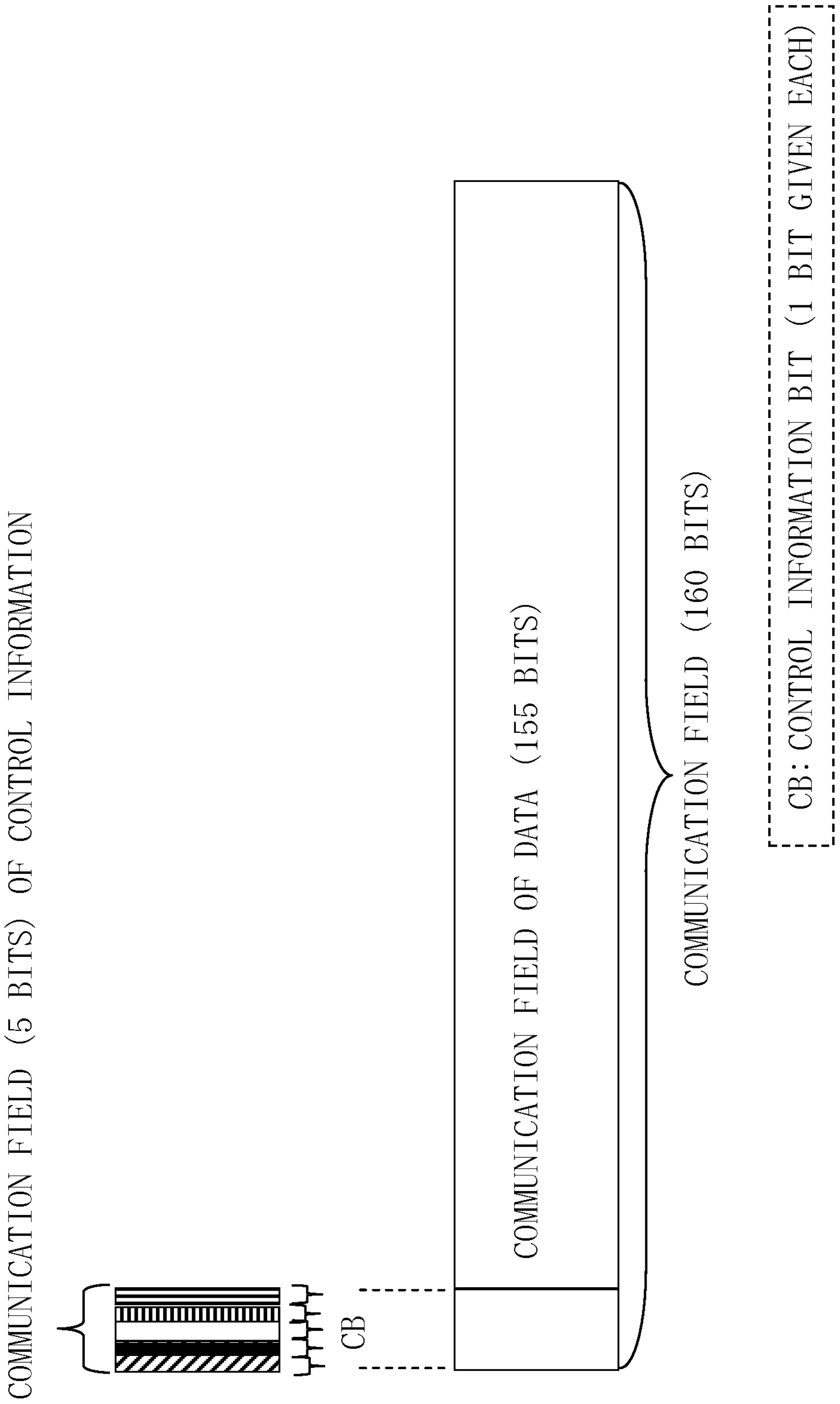
FIG. 2 is a diagram illustrating a communication method of control information for the AMC in a first embodiment.

The base station 1 and the mobile terminals 2, 3 transmit, as illustrated in FIG. 2, the control information for the AMC by a method which does not implement “Repetition”. With this scheme, the mobile terminal 3 in the vicinity of a cell edge can not receive the control information for the AMC, and hence the AMC area 5 is limited to an area peripheral to the base station 1, which is narrower than the entire area of the cell.

Figure 25:
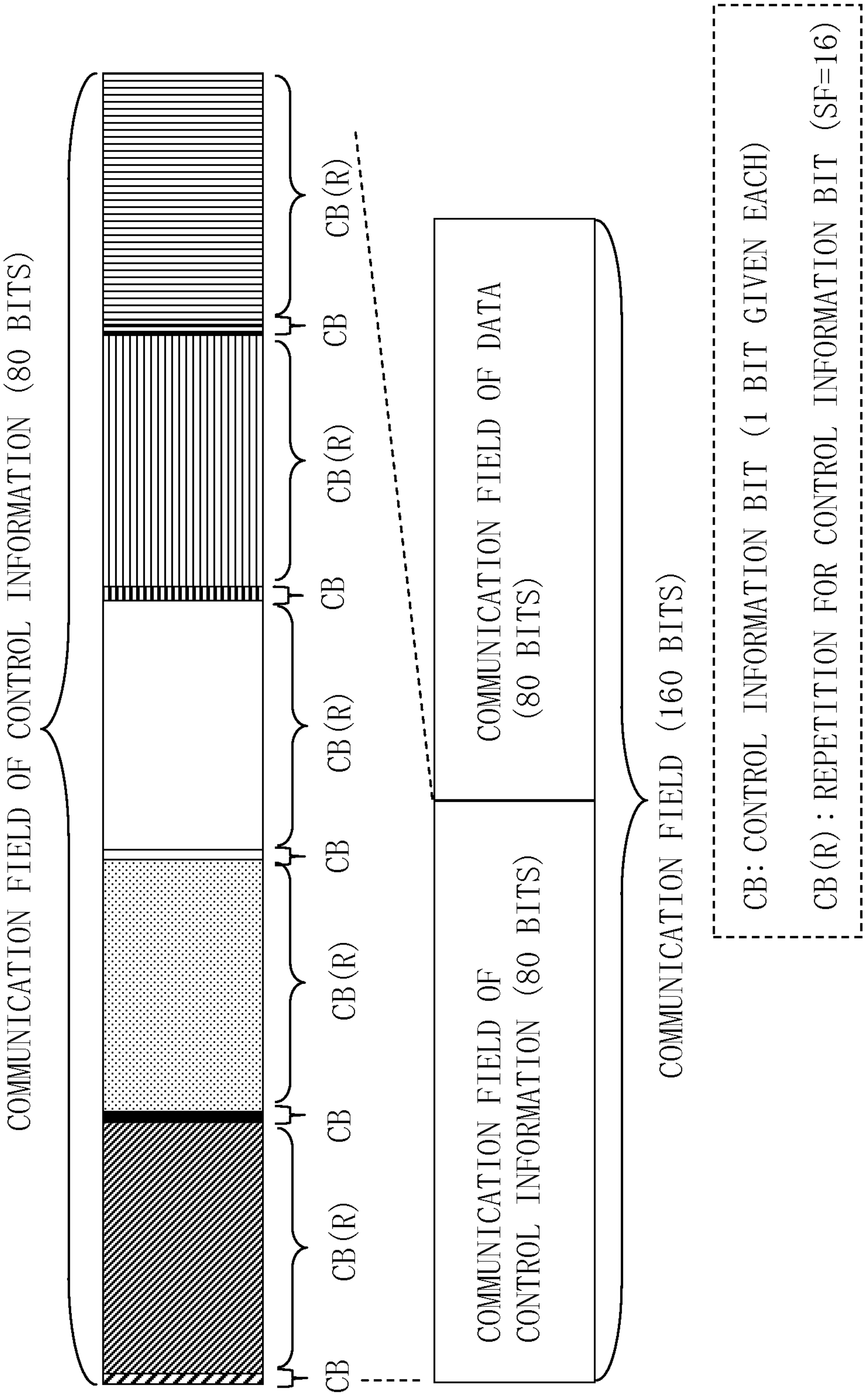
FIG. 25 is a diagram illustrating a communication method of the control information for the AMC.

FIG. 2 is a diagram illustrating a communication method for the control information for the AMC in the first embodiment, which corresponds to the conventional method in FIG. 25. According to the communication method in FIG. 2, as compared with the case of the communication method in FIG. 25, a 75-bit area is reduced as a communication field for the control information. The reduced area can be thereby ensured as a user data communication field.

Further, according to this communication method, a multiplier effect enables a quantity of the information used for SINR notification to be restrained. This is because of having no necessity for providing a MCS Set corresponding to the cell edge. FIG. 3 is a diagram illustrating a mapping table between a CQI value and the MCS Set in the case of employing the CQI (Channel Quality Indicator) value as the information used for the SINR notification. The conventional method entails providing the MCS Set at the cell edge and the CQI value corresponding to the MCS Set in the case of applying the AMC also at the cell edge, however, the first embodiment entails providing neither the MCS Set at the cell edge nor the CQI value. According to the example in FIG. 3, the control bits needed for the CQI transmission can be reduced down to 5 bits ($2^5=32$) from the conventional 6 bits ($2^6=64$). Note that this is also the same as in the case of making use of values other than the CQI value as the information employed for the SINR notification.

In the mobile communication system in the first embodiment, the TPC (TPC area 6) is utilized in the area existing outside of the AMC area 5 within the cell domain. According to this scheme, in the case of applying the AMC within the whole cell as by the conventional method, it is feasible to reduce the SINR notification and to improve frequency-utilization efficiency within the TPC area. Further, in the TPC area 6, if possible of selecting time, a frequency band and a space of a highly acceptable propagation environment by operating a scheduler as hitherto done, it is feasible to decrease the transmission power under the condition of a fixed communication rate and to reduce a quantity of interference exerted on the neighboring cell.

In the TPC area 6 also, in the case of operating the scheduler, the communication field in which the SINR notification information utilized for the AMC is allocated can be diverted to packet communications etc in such a way that a function unit of a higher-order communication layer changes a communication format. Further, in the case of performing the inner-loop TPC, the TPC control bits of which the receiving-side device notifies the transmitting-side device may also be allocated to the communication field where the SINR notification information is allocated. It should be noted that the present invention does not limit the wireless communication system utilized in the area outside the AMC area 5, and hence wireless communication systems other than the TPC may also be utilized.

[Configuration of Device]

A detailed functional configuration of each of the devices building up the mobile communication system in the first embodiment will hereinafter be described. Note that the following discussion will be, for the explanatory convenience, focused on a function as a receiving station with respect to the base station 1 and focused on a function as a transmitting station with respect to the mobile terminals 2 and 3. It is assumed that each of the base station 1 and the mobile terminals 2, 3 has both of the function as the transmitting station and the function as the receiving station.

<Mobile Terminal>

Figure 4:
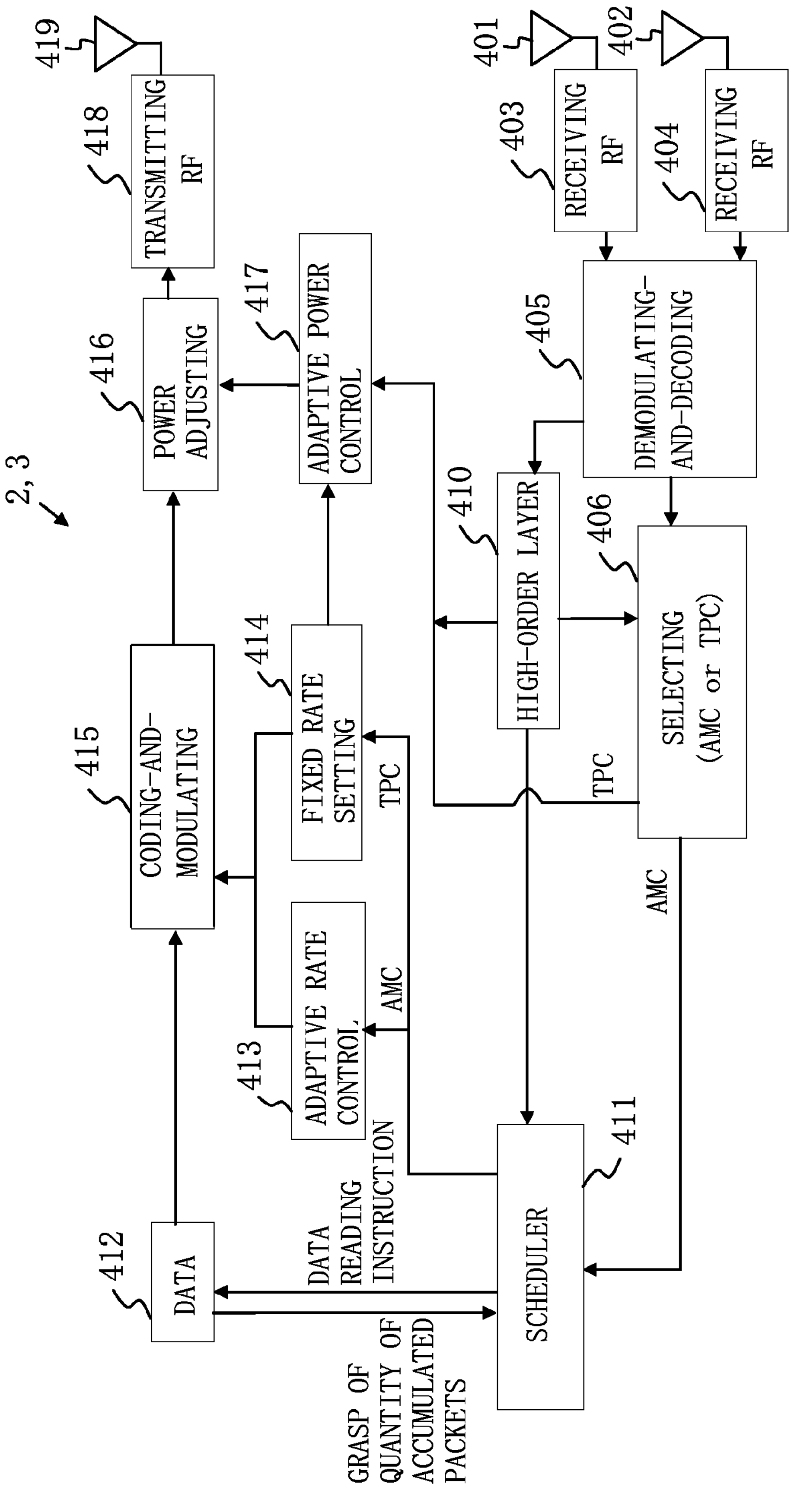
FIG. 4 is a diagram illustrating a functional configuration of a mobile terminal as a transmitting station in the first embodiment.

The functional configuration of each of the mobile terminals 2, 3 will be explained with reference to FIG. 4. FIG. 4 is a block diagram illustrating the functional configuration of the mobile terminal as the transmitting station in the first embodiment. Each of the mobile terminals 2, 3 is assumed to have function units illustrated in FIG. 4, and in the following discussion the mobile terminal 2 will be explained as a representative device.

The mobile terminal 2 includes, as functions for operating as the transmitting station, receiving antennas 401, 402, receiving units 403, 404, a demodulating-and-decoding unit 405, a selecting unit 406, a high-order layer function unit 410, a scheduler 411, a transmission packet queue 412, an adaptive rate control unit 413, a fixed rate setting unit 414, a coding-and-modulating unit 415, a power adjusting unit 416, an adaptive power control unit 417, a transmitting unit 418, a transmission antenna 419, etc. Each of the function units may be realized by a hardware circuit as a hardware configuration and may also be actualized in such a way that a control program stored in the memory is loaded and executed by a CPU (Central Processing Unit).

The receiving unit 403 is connected to the receiving antenna 401, and the receiving unit 404 is connected to the receiving antenna 402. The receiving units 403, 404, upon receiving controls signals (general control information and selection control information) from the base station 1 that have been received by the receiving antennas 401, 402 connecting therewith, carry out a frequency converting process, an analog/digital converting process, etc about the control signals. The receiving units 403, 404 send digital baseband signals undergoing these predetermined processes to the demodulating-and-decoding unit 405.

The demodulating-and-decoding unit 405, when receiving the control signals from the receiving units 403, 404, demodulates and decodes the control signals in a predetermined system for an dedicated control channel. At this time, if the control signals are spreading-modulated, the demodulating-and-decoding unit 405 executes reverse-spreading with a spreading code for the control channel unique to the user. The present invention does not limit the demodulating-and-decoding method, and it is therefore sufficient to have a general demodulating-and-decoding function applicable to the system to be used.

Figure 5:
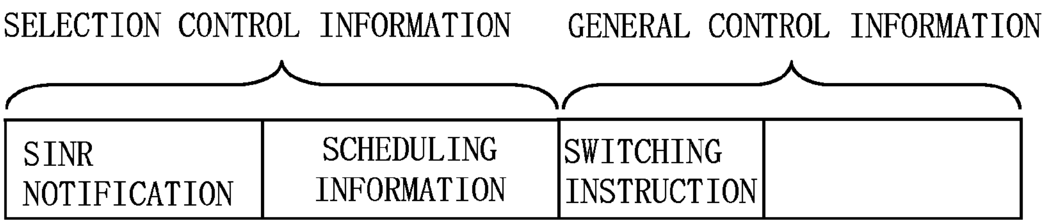
FIG. 5 is a diagram illustrating an example of a format of a control signal.
Figure 6:
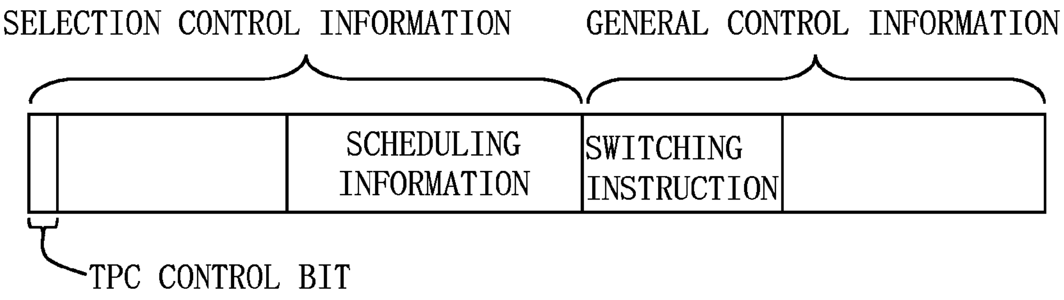
FIG. 6 is a diagram illustrating an example of the format of the control signal.
Figure 7:
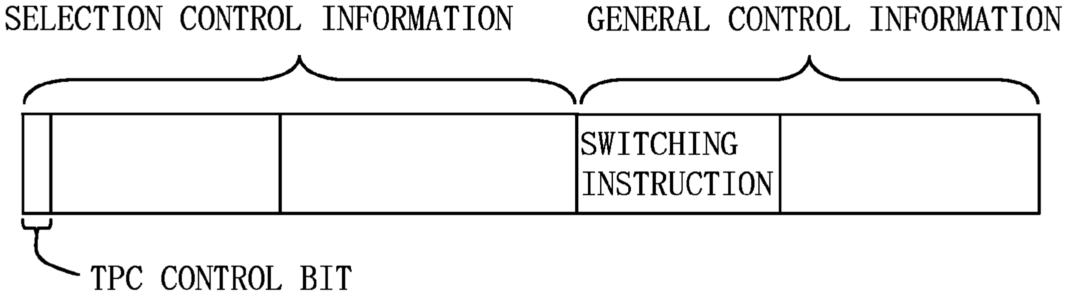
FIG. 7 is a diagram illustrating an example of the format of the control signal.

FIGS. 5, 6 and 7 are diagrams each illustrating a format of the control signal received via the dedicated control channel. The control signal from the base station 1 has any one of the formats in FIGS. 5, 6 and 7, corresponding to a control status thereof. An in-depth description of the format of the control signal will be made later on. The demodulating-and-decoding unit 405 sends the selection control information acquired by the demodulating-and-decoding process in the received control signal to the selecting unit 406, and sends the likewise-acquired general control information and the selection control information to the high-order layer function unit 410.

The high-order layer function unit 410 refers to a switching instruction in the general control information, thereby determining whether the TPC or the AMC should be applied. The high-order layer function unit 410 notifies the selecting unit 406 of the communication format of this communication system and the selection control information channel. Furthermore, the high-order layer function unit 410 sends the thus-determined communication method to the adaptive power control unit 417.

Moreover, the high-order layer function unit 410, when the TPC is selected as the communication method, further determines whether the scheduler 411 be operated or scheduling based on the fixed frequency band and timing be performed, or determines a transmission rate thereof, etc. The high-order layer function unit 410 sends the thus-determined information to the scheduler 411. The high-order layer function unit 410, for example, if the scheduling information is stored in the selection control information (see FIGS. 5 and 6), determines that the scheduler 411 be operated, and notifies the scheduler 411 of this scheduling information.

The selecting unit 406, upon receiving the communication method and the communication format of which the high-order layer function unit 410 notifies, acquires the selection control information sent from the demodulating-and-decoding unit 405 based on this communication method. The selecting unit 406, if the notified communication method is the AMC, acquires the SINR notification information (see FIG. 5) in the selection control information. The selecting unit 406 sends the acquired SINR notification information to the scheduler 411.

While on the other hand, if the notified communication method is the TPC, the selecting unit 406 acquires the TPC control bits (see FIG. 6) in the selection control information. Note that if only outer loop control is implemented as the TPC, a scheme of referring to none of the TPC control bits is also available. The selecting unit 406 sends the acquired TPC control bits to the adaptive power control unit 417.

The scheduler 411, when receiving the SINR notification information from the selecting unit 406, executes a process for the AMC. To be specific, the scheduler 411 determines a proper modulation method and coding method on the basis of a packet quantity, being sent from the transmission packet queue 412, being accumulated and being scheduled to be transmitted and the SINR notification information. The proper modulation method and coding method, which are determined by the scheduler 411, are referred to as an adaptive modulation rate as the case may be. The scheduler 411 sends the thus-determined adaptive modulation rate to the adaptive rate control unit 413. It should be noted that the present invention does not restrict the method of determining the adaptive modulation rate of the scheduler 411, and, because of a general determination method being available, its detailed description is omitted. Moreover, the information on the adaptive modulation rate determined by the scheduler 411 is transmitted as uplink control information from the transmitting antenna 419.

Further, the scheduler 411, when receiving the notifications of the communication method (TPC), the transmission rate, etc from the high-order layer function unit 410, determines the modulation method and the coding method corresponding to the notified transmission rate. The scheduler 411 sends the thus-determined modulation method and coding method to the fixed rate setting unit 414.

Moreover, the scheduler 411, upon receiving the scheduling information from the high-order layer function unit 410, determines allocation of a transmission opportunity based on the scheduling information. The scheduler 411 issues an instruction of reading a predetermined data amount to the transmission packet queue 412, corresponding to the determined allocation opportunity.

The transmission packet queue 412, in response to the reading instruction given from the scheduler 411, transmits the transmission packets equivalent to the likewise-notified data amount to the coding-and-modulating unit 415.

The coding-and-modulating unit 415 codes and modulates the transmission packet data transmitted from the transmission packet queue 412 on the basis of the modulation method and the coding method that are sent from the adaptive rate control unit 413 or the fixed rate setting unit 414. The coding-and-modulating unit 415 transmits the coded/modulated signals to the power adjusting unit 416.

The adaptive power control unit 417 determines the transmission power corresponding to the communication method of which the high-order layer function unit 410 notifies. Specifically, the adaptive power control unit 417, when the notified communication method is the AMC, determines the transmission power to be the maximum transmission power. By contrast, the adaptive power control unit 417, when the notified communication method is the TPC, increases or decreases the transmission power in accordance with the TPC control bits transmitted from the selecting unit 406, and sends the determined transmission power to the power adjusting unit 416. Note that when the notified communication method is the AMC, the MCS Set may specify the decrease of the transmission power. The transmission power decreasing process by the MCS Set may involve using the conventional technique.

The power adjusting unit 416 sets the signals transmitted from the coding-and-modulating unit 415 in the transmission power sent from the adaptive power control unit 417. The power adjusting unit 416 transmits the signals set in the transmission power to the transmitting unit 418.

The transmitting unit 418 executes the digital/analog conversion, the frequency conversion, etc about the signals transmitted from the power adjusting unit 416, and gets the transmission signals to radiate from the transmitting antenna 419 to be connected. Incidentally, though not explicitly described, predetermined pilot signals are channel-allocated by a general method and transmitted from the transmitting antenna 419 at any time.

<Base Station>

Figure 8:
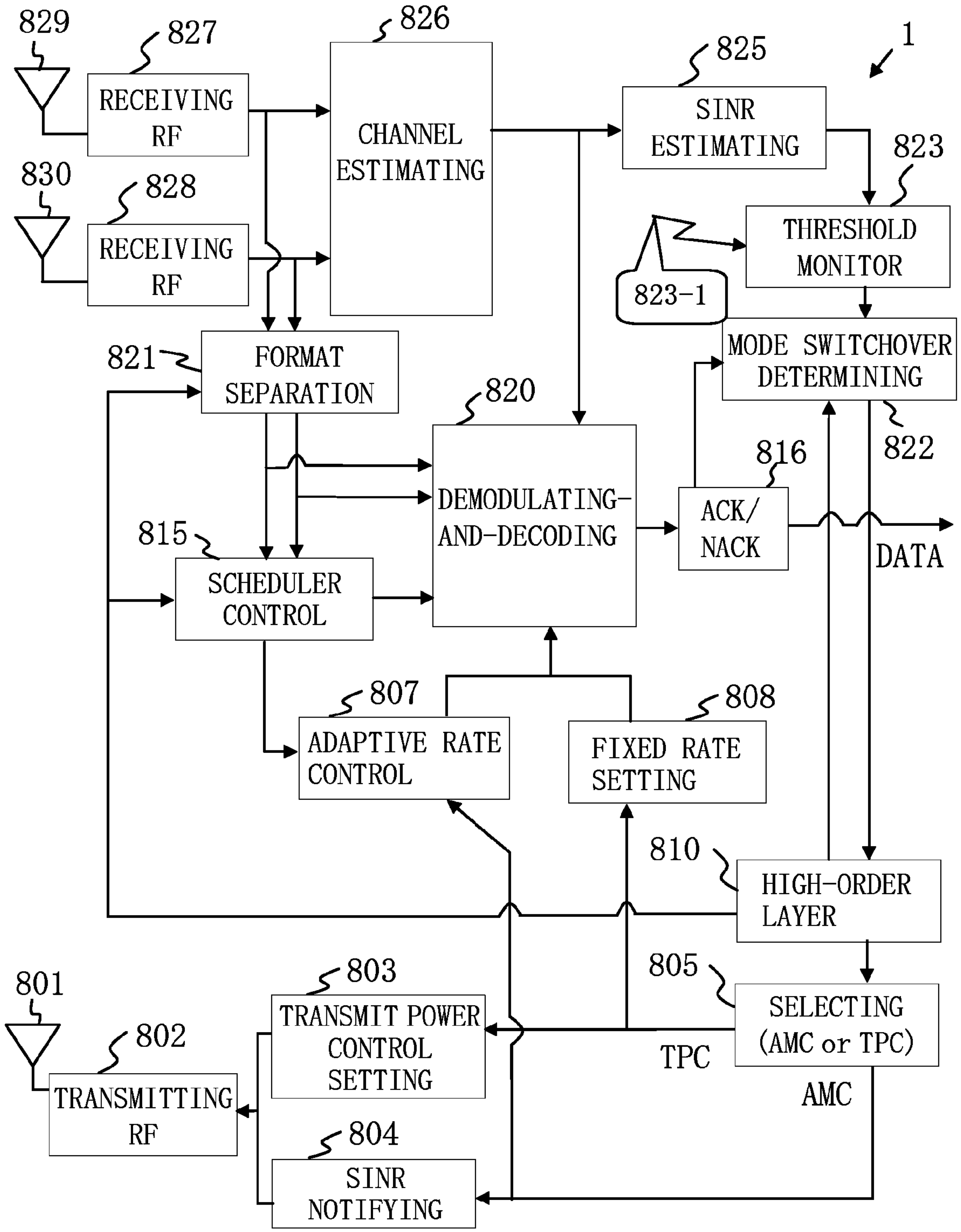
FIG. 8 is a diagram illustrating a functional configuration of a base station as a receiving station in the first embodiment.

A functional configuration of the base station 1 will hereinafter be described with reference to FIG. 8. FIG. 8 is a block diagram illustrating the functional configuration of the base station 1 as a receiving station in the first embodiment.

The base station 1 includes, as functions for operating as the receiving station, a transmitting antenna 801, a transmitting unit 802, a transmit power control setting unit 803, an SINR notifying unit 804, a selecting unit 805, an adaptive rate control unit 807, a fixed rate setting unit 808, a high-order layer function unit 810, a scheduler control unit 815, a data determining unit 816, a demodulating-and-decoding unit 820, a format separation unit 821, a mode switchover determining unit 822, a threshold monitor 823, an SINR estimating unit 825, a channel estimating unit 826, receiving units 827, 828, receiving antennas 829, 830, etc. Each of the function units may be realized by a hardware circuit as a hardware configuration and may also be actualized in such a way that the control program stored in the memory is loaded and executed by the CPU (Central Processing Unit).

The receiving unit 827 is connected to the receiving antenna 829, and the receiving unit 828 is connected to the receiving antenna 830. The receiving units 827, 828, upon receiving signals from the mobile terminals 2, 3 that have been received by the receiving antennas 829, 830 connected thereto, execute the frequency-converting process and the analog/digital converting process about the received signals. The receiving units 827 and 828 transmit the pilot signals in the received signals to the channel estimating unit 826, and transmit the received signals other than the pilot signals to the format separation unit 821.

The channel estimating unit 826 calculates, based on the pilot signals transmitted from the receiving units 827, 828, a channel estimation value between the sender mobile terminal 2 or 3 and the base station 1. The present invention does not limit the channel estimation method, and it is therefore sufficient that a general channel estimation method is carried out. The channel estimating unit 826 sends the channel estimation value to the demodulating-and-decoding unit 820 and the SINR estimating unit 825, respectively.

The format separation unit 821, when receiving the received signal, separates the control signal and the user data signal according to the communication format of which the high-order layer function unit 810 notifies. At this time, if the AMC is applied to the communication with the sender mobile terminal, the control signal contains information on the adaptive modulation rate selected by the mobile terminal. While on the other hand, if the TPC is applied thereto, this item of information is not contained, and the user data is contained in the allocation area thereof. The format separation unit 821 transmits the separated control signal and user data signal to the scheduler control unit 815 and the demodulating-and-decoding unit 820, respectively.

The scheduler control unit 815 notifies, when the scheduler is utilized, the demodulating-and-decoding unit 820 of an allocation area (frequency band, timing) with respect to the sender mobile terminal on the basis of the scheduler information of which the high-order layer function unit 810 notifies. Further, the scheduler control unit 815, if the AMC is applied to the sender mobile terminal, transmits the information on the adaptive modulation rate selected by the mobile terminal, which is contained in the control signal, to the adaptive rate control unit 807.

The adaptive rate control unit 807 receives the information about the adaptive modulation rate from the scheduler control unit 815. At this time, the selecting unit 805 has already notified the adaptive rate control unit 807 that the AMC method is applied to the signals transmitted from the sender mobile terminal. Accordingly, the adaptive rate control unit 807 notifies the demodulating-and-decoding unit 820 of the communication method related to the signals transmitted from the sender mobile terminal and the information on the adaptive modulation rate.

The selecting unit 805 has already, if the TPC method is applied to the signals from the sender mobile terminal, notified the fixed rate setting unit 808 that the TPC method is applied to the signals from the sender mobile terminal and of the information about the modulation method and the coding method applied in the case of the TPC. The fixed rate setting unit 808 notifies the demodulating-and-decoding unit 820 of the communication method related to the signals from the sender mobile terminal and the information about the modulation method and the coding method.

The demodulating-and-decoding unit 820 executes the demodulating-and-decoding process with respect to the user data signals on the basis of the allocation area sent from the scheduler control unit 815 and the modulation method and the coding method of which the any one of the adaptive rate control unit 807 and the fixed rate setting unit 808 notifies. At this time, the demodulating-and-decoding unit 820 may make use of the channel information sent from the channel estimating unit 826 for correcting fluctuations on a propagation path when demodulating and decoding. The thus-demodulated-and-decoded user data is transmitted to the data determining unit 816.

The data determining unit 816 determines whether the decoded user data is received without any error or not. This determination involves using, e.g., a CRC (Cyclic Redundancy Check). The data determining unit 816 determines whether the data is normally received without any error (ACK status) or not correctly received with occurrence of the error (NACK status). The data determining unit 816 may feed back these results to the mode switchover determining unit 822. The data determining unit 816, when determining that the status is the ACK status, transmits the user data to other function units (unillustrated).

The SINR estimating unit 825 estimates the SINR by use of the channel estimation value sent from the channel estimating unit 826, an already-known pilot symbol, etc. The present invention does not restrict the SINR estimation method, and hence it is enough that a general SINR estimation method is carried out. The SINR estimating unit 825 transmits the estimated SINR to the threshold monitor unit 823.

The threshold monitor unit 823 manages the MCS Set shown in FIG. 3. The threshold monitor unit 823 acquires the CQI corresponding to the SINR sent from the SINR estimating unit 825. At this time, the threshold monitor unit 823 acquires the CQI corresponding to the SINR on the basis of the CQI-to-SINR mapping relationship stored in, e.g., a lookup table (unillustrated). Subsequently, the threshold monitor unit 823 refers to the MCS Set and thus determines whether the valid CQI value acquired exists or not. According to the example in FIG. 3, the threshold monitor unit 823 determines that the valid CQI exists if the CQI corresponding to the SINR is equal to or smaller than 31, and determines that any valid CQI does not exist if the CQI is equal to or larger than 32.

The threshold monitor unit 823 notifies the mode switchover determining unit 822 of the determined result in the CQI check. The threshold monitor unit 823, when determining that the valid CQI exists, similarly notifies the mode switchover determining unit 822 of the CQI value.

Figure 9:
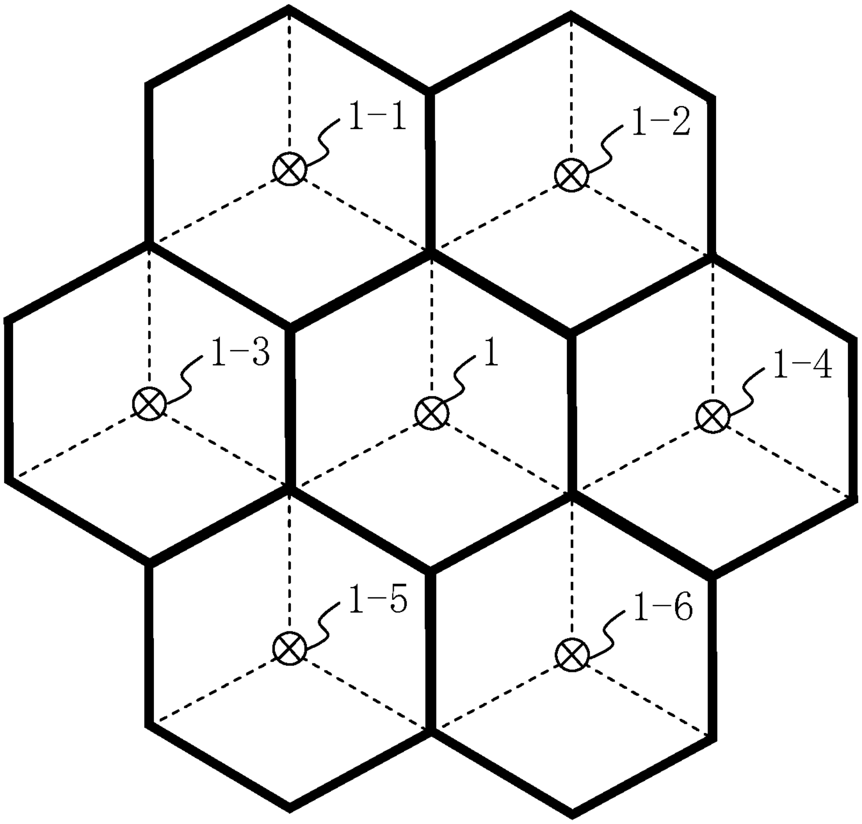
FIG. 9 is a diagram illustrating a cell configured by the base station and the neighboring base stations.

The threshold monitor unit 823 may further have a function of optimizing the MCS Set based on predetermined information (823-1). The optimizing function will hereinafter be described with reference to FIG. 9. FIG. 9 is a diagram illustrating the cells configured by the base station 1 and neighboring base stations 1-1, 1-2, 1-3, 1-4, 1-5, 1-6. The example of this cell configuration implies that the neighboring base stations turn out to be stations of interference with the base station 1. For example, the high-order layer function unit 810 of the base station 1 collects pieces of RoT (Rise over Thermal) information of the neighboring base stations 1-1 through 1-6, and the threshold monitor unit 823 determines based on the RoT information whether the valid value of the MCS Set is increased or decreased. To be specific, the valid value of the MCS is reduced (the number of "x" in FIG. 3 is increased) if the neighboring base stations include one or more base stations having the high RoT value, and the valid value of the MCS is increased (the number of "x" in FIG. 3 is decreased) whereas if all of the base stations have the smaller RoT value. An in-depth description of the MCS Set automatic optimization method by the threshold monitor unit 823 will be given in the paragraph of Operational Example.

Note that the RoT value is calculated by comparing (1+N) with an initial value N, which are acquired in the course of receiving the pilot signal and calculating the SINR. The neighboring base station may notify another neighboring base station of the thus-calculated RoT information.

The mode switchover determining unit 822 determines, based on the CQI check in the threshold monitor unit 823, whether or not the communication method for the signals to be transmitted between the target mobile terminal and the base station 1 itself should be switched over (the mode should be switched over). The mode switchover determining unit 822 acquires, from the high-order layer function unit 810, the communication method applied at the present to the target mobile terminal, and determines the mode switchover by referring to the communication method. A detailed explanation of the mode switchover method by the mode switchover determining unit 822 will be made in the paragraph of Operational Example. The mode switchover determining unit 822 transmits the determined mode switchover information and the CQI value to the high-order layer function unit 810.

The high-order layer function unit 810 retains the information on each communication method (the AMC or the TPC) applied to the individual mobile terminal. The high-order layer function unit 810 sends the retained information to the mode switchover determining unit 822 in response to a request. Further, the high-order layer function unit 810, upon receiving from the mode switchover determining unit 822 the notification purporting that the mode switchover occurs, determines the format (see FIGS. 5, 6 and 7) after the mode switchover of the control signals transmitted via the dedicated control channel for the target mobile terminal. The high-order layer function unit 810 notifies the format separation unit 821 of the format for the control signals after the determined mode switchover.

The high-order layer function unit 810, when the switchover to the AMC from the TPC occurs, changes the format to the control signal format shown in FIG. 5. At this time, the high-order layer function unit 810 transmits, to the selecting unit 805, the CQI value sent from the mode switchover determining unit 822 together with the information showing the occurrence of the switchover to the AMC. Note that the information transmitted as the SINR notification information is not limited to the CQI, and the SINR value itself may also be transmitted.

Further, the high-order layer function unit 810, when switched over to the TPC from the AMC, changes to the control signal format illustrated in FIG. 6 or 7. At this time, the high-order layer function unit 810 may also determine the area serving as the SINR notifying area in FIG. 5 to be a user data area. If scheduling is not executed, the scheduling information area for the selection control information may be deleted (see FIG. 7). The high-order layer function unit 810 sends, to the selecting unit 805, the scheduling information on the transmission opportunity allocation, the TPC control bits, etc together with the information showing the occurrence of the switchover to the TPC. The scheduling information is transmitted also to the scheduler control unit 815.

Moreover, the high-order layer function unit 810, when receiving the notification purporting that the switchover of the communication method occurs, may also recognize the switchover of the communication format by signaling between the target mobile terminal and the base station 1 itself. This scheme enables the target mobile terminal to perform the communications based on the new format after completion of signaling. The selecting unit 805 transmits, based on the switchover information received from the high-order layer function unit 810, the CQI value to the SINR notifying unit 804 when switched over to the AMC, and notifies the adaptive rate control unit 807 that the AMC is applied to the target mobile terminal. On the other hand, the selecting unit 805 sends, when switched over to the TPC, the TPC control bits and the scheduling information to the transmit power control setting unit 803, and notifies the fixed rate setting unit 808 of the information about the fixed modulation method and coding method applied when by the TPC method.

The SINR notifying unit 804, when receiving the CQI value from the selecting unit 805, sets a flag of the switchover to the AMC in the switchover instructing area for the general control information in the control information to the mobile terminal, sets the CQI value in the SINR notifying area for the selection control information, and further sets the transmission opportunity allocation information in the scheduling information area. Incidentally, if scheduling is not carried out, the scheduling information area for the selection control information may be deleted.

The transmit power control setting unit 803, upon receiving the scheduling information and the TPC control bits from the selecting unit 805, sets the flag of the switchover to the TPC in the switchover instructing area for the general control information in the control information to the mobile terminal, sets the TPC control bits in the selection control information, and further sets the allocation information in the scheduling information area. The transmitting unit 802 executes the digital/analog conversion, the frequency conversion, etc about the thus-generated control signal, and gets the generated transmission signal to radiate from the transmitting antenna 801 to be connected.

[Operational Example]

A mode switchover operation by the mode switchover determining unit 822 and an operation by which the threshold monitor unit 823 automatically optimizes the MCS Set, will hereinafter be described, respectively.

Figure 10:
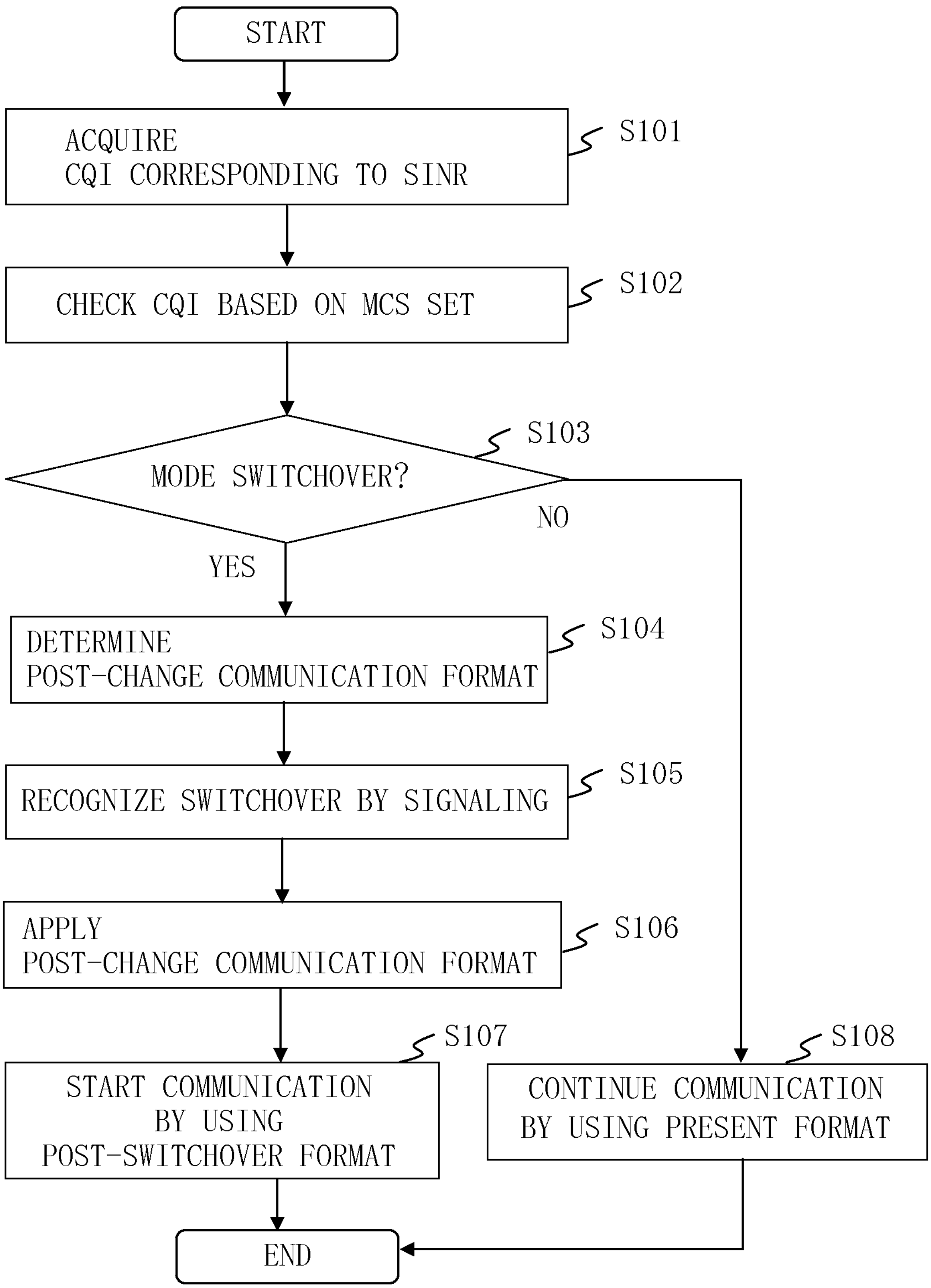
FIG. 10 is a diagram illustrating an outline of an operation of determining a communication method (switchover mode) of the base station in the first embodiment.

Before explaining the operational examples thereof, at first, an outline of the operation of determining the communication method (switchover mode) of the base station 1 in the first embodiment will be described with reference to FIG. 10. FIG. 10 is a flowchart illustrating the outline of the operation of determining the communication method (switchover mode) of the base station 1 in the first embodiment.

The signals received by the receiving antennas 829, 830 from the mobile terminal are subjected to a predetermined signal process by the receiving units 827, 828. The SINR estimating unit 825 estimates the SINR by use of a channel estimation value obtained by the channel estimating unit 826 from the thus-acquired pilot signal from the mobile terminal. The base station 1 in the first embodiment determines the switchover mode by employing the SINR as follows.

The threshold monitor unit 823 acquires the CQI corresponding to the SINR sent from the SINR estimating unit 825 (S101). The threshold monitor unit 823 refers to the MCS Set, thereby checking whether this CQI is the valid CQI value or not (S102). The threshold monitor unit 823 notifies the mode switchover determining unit 822 of a result of this CQI check.

The mode switchover determining unit 822 receives the result of this CQI check from the threshold monitor unit 823 and acquires, from the high-order layer function unit 810, the information on the communication method applied at the present to the target mobile terminal with respect to the CQI. The mode switchover determining unit 822 determines the mode switchover on the basis of the result of this CQI check and the present communication method (S103). The mode switchover determining unit 822 transmits the thus-determined mode switchover information to the high-order layer function unit 810.

When determining based on the mode switchover information transmitted from the mode switchover determining unit 822 that the mode switchover does not occur (S103; NO), the communication format used at the present for the communications with the mobile terminal is employed as it is (S108).

While on the other hand, when determining that the mode switchover occurs (S103; YES), the post-mode-switchover communication format of the control signals transmitted via the dedicated control channel for the target mobile terminal, is determined (S104) (see FIGS. 5, 6 and 7). The high-order layer function unit 810, when determining the post-mode-switchover communication format, shares the recognition of the communication mode switchover with the mobile terminal by signaling (S105). Thereafter, the communication format sent between the mobile terminal becomes the post-mode-switchover communication format (S106 and S107).

Figure 11:
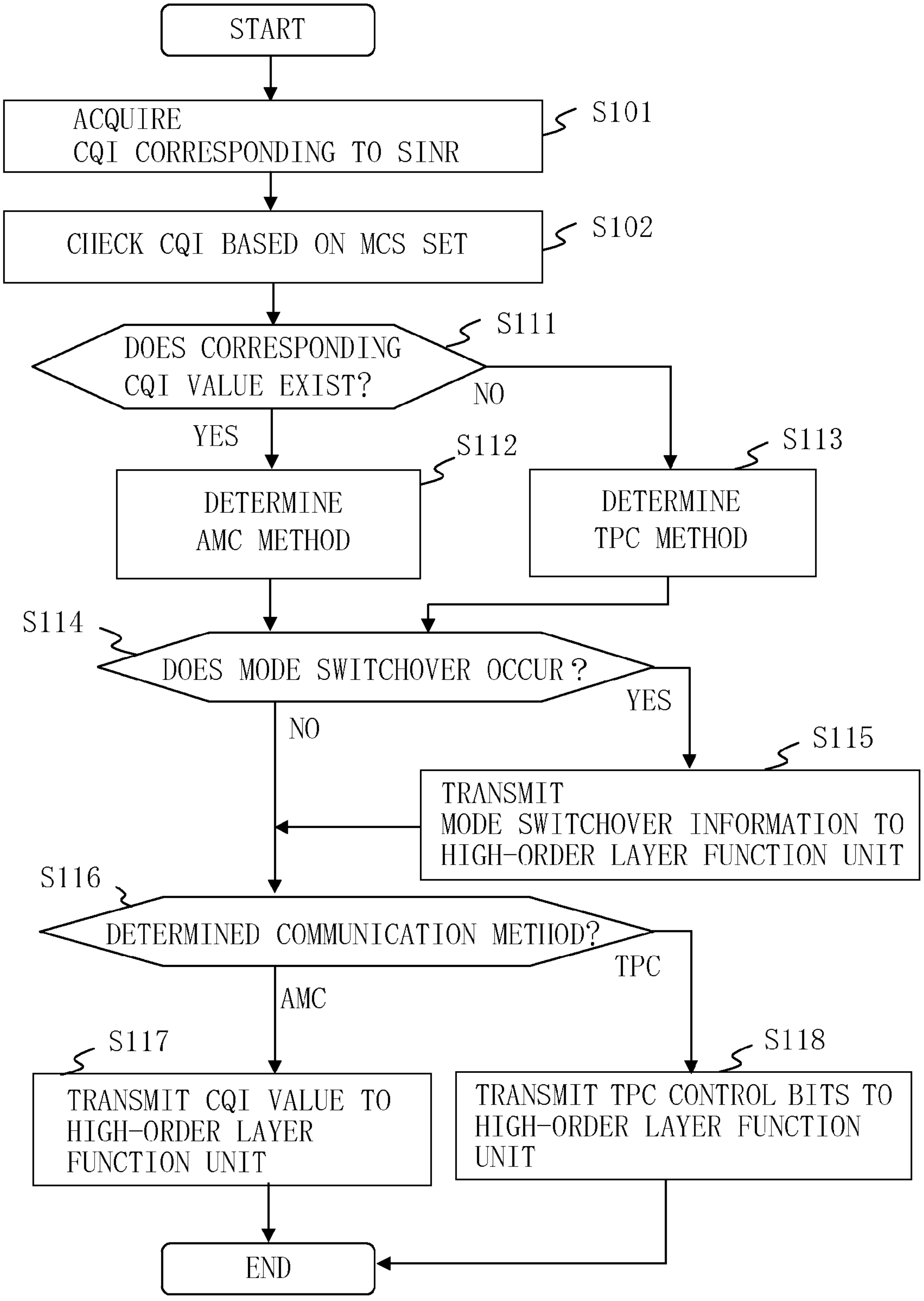
FIG. 11 is a diagram illustrating an operational example based on a first determining method of a mode switchover.
Figure 12:
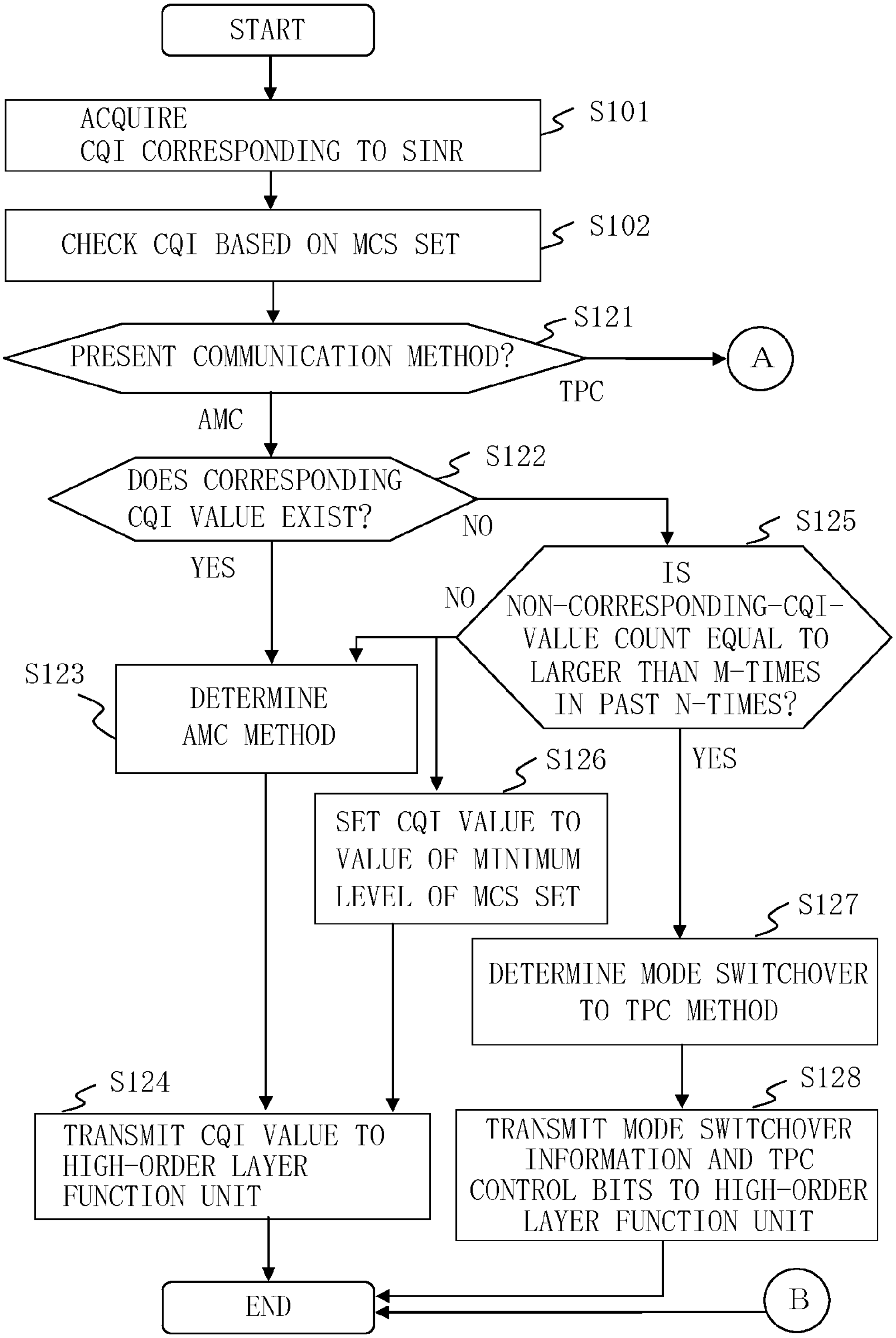
FIG. 12 is a diagram illustrating an operational example based on a second determining method of a mode switchover.
Figure 13:
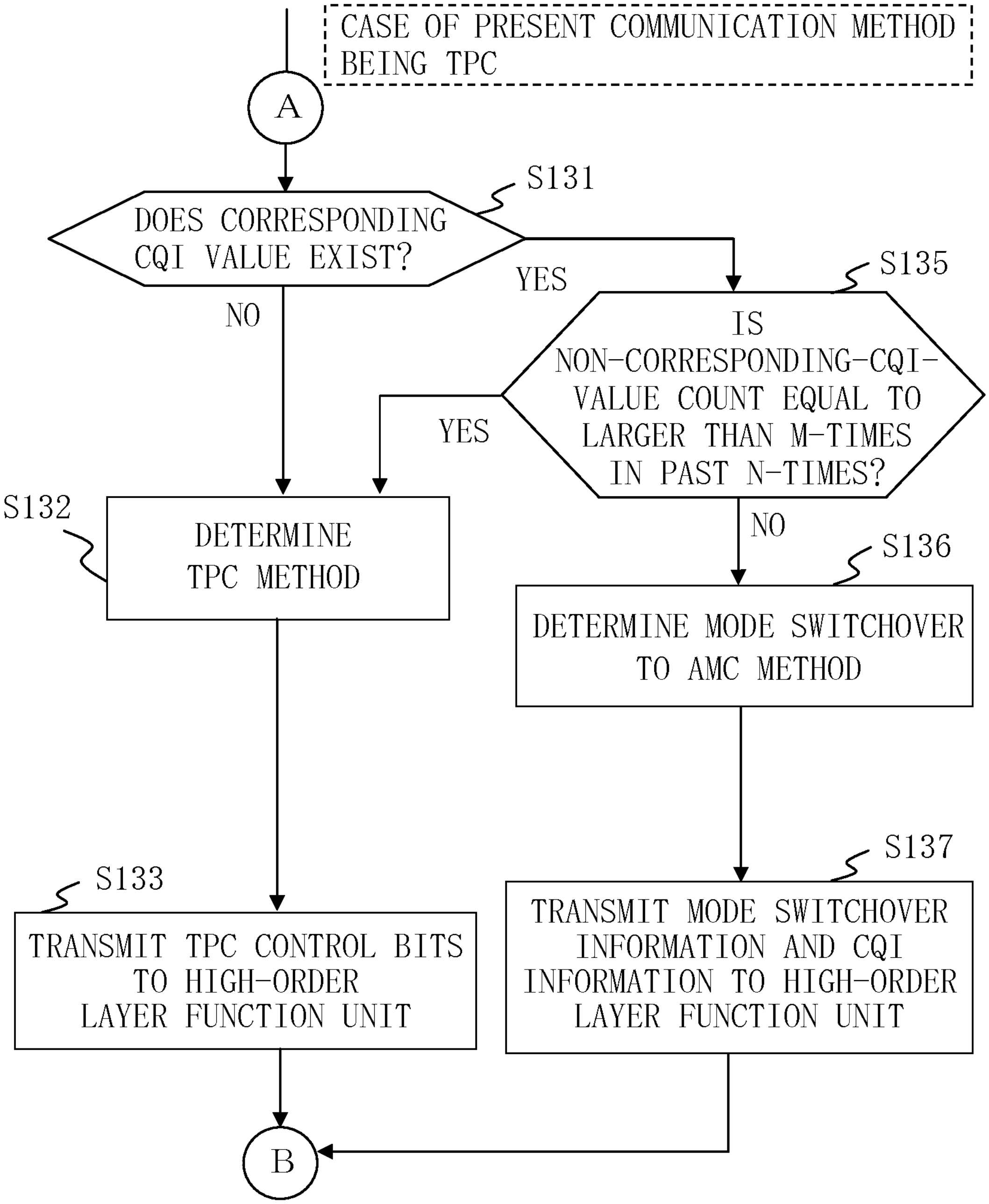
FIG. 13 is a diagram illustrating an operational example based on the second determining method of a mode switchover.
Figure 14:
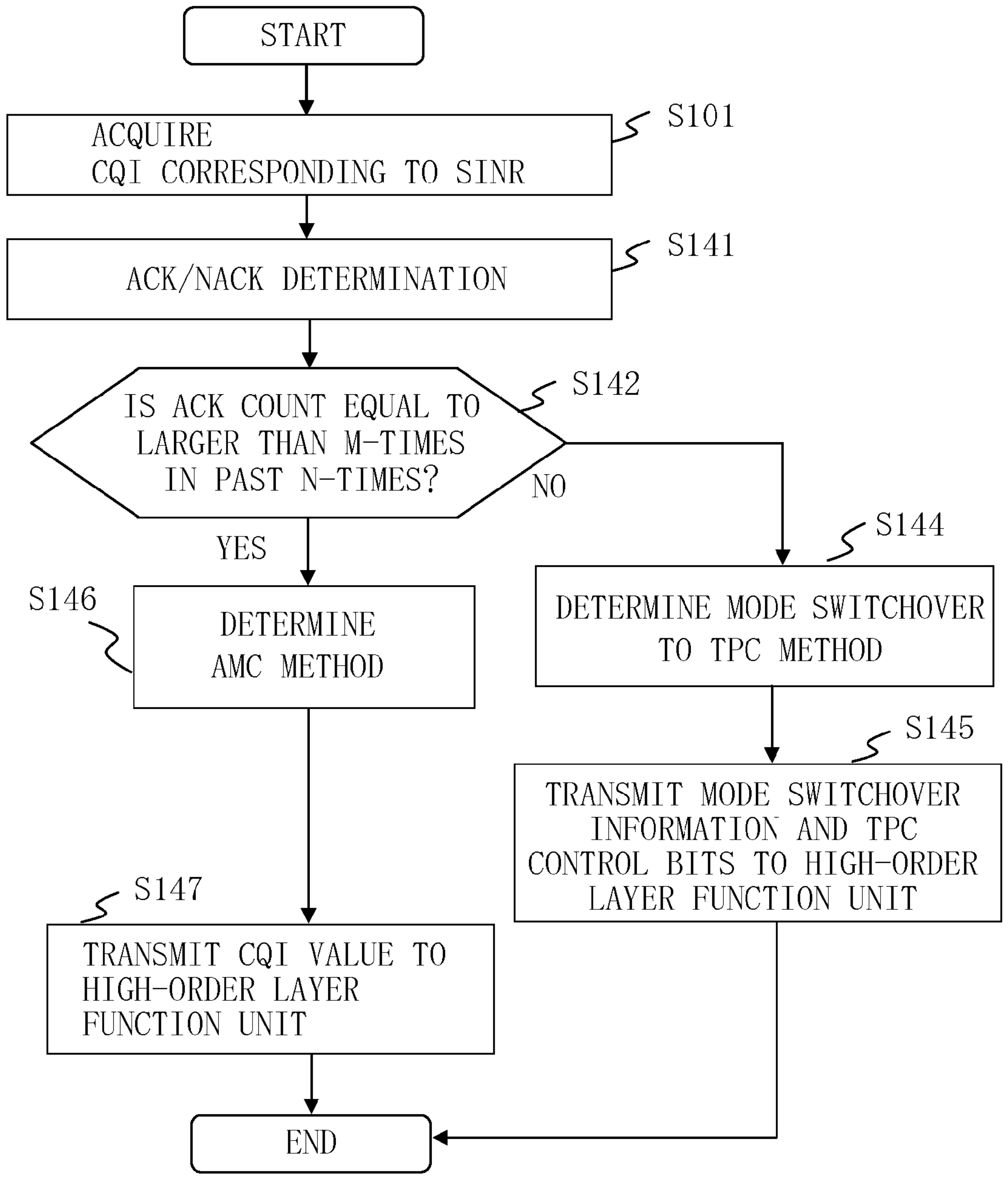
FIG. 14 is a diagram illustrating an operational example based on a third determining method of a mode switchover.

Herein, an in-depth description of the mode switchover operation by the mode switchover determining unit 822 will be made with reference to FIGS. 11, 12, 13 and 14, respectively. There are three methods each exemplified as the mode switchover determining method by the mode switchover determining unit 822. FIG. 11 is a flowchart illustrating an operation based on a first determining method, FIGS. 12 and 13 are flowcharts each illustrating an operation based on a second determining method, and FIG. 14 is a flowchart illustrating an operation based on a third determining method.

According to the first determining method, the mode switchover determining unit 822, when receiving the result of the CQI check by the threshold monitor unit 823 and the CQI value, determines the mode switchover as follows.

The mode switchover determining unit 822, when determining as the result of the CQI check that the corresponding valid CQI value exists (S111; YES), determines that the AMC method is applied to the communications with the mobile terminal (S112). Conversely, the mode switchover determining unit 822, when determining as the result of the CQI check that the corresponding valid CQI value does not exist (S111; NO), determines that the TPC method is applied to the communications with the mobile terminal (S113).

The mode switchover determining unit 822 compares the determined communication method with information about the communication method applied at the present to the target mobile terminal, thereby determining whether the mode switchover occurs or not (S114). The mode switchover determining unit 822 determines, if the determined communication method is different from the present communication method, that the mode switchover occurs (S114; YES), and transmits the mode switchover information to the high-order layer function unit 810 (S115). Whereas if the determined communication method is coincident with the present communication method, it is determined that the mode switchover does not occur (S114; NO), none of the mode switchover information is transmitted to the high-order layer function unit 810. Then, the mode switchover determining unit 822 transmits the CQI value to the high-order layer function unit 810 if the determined communication method is the AMC (S117), and transmits the TPC control bits to the high-order layer function unit 810 if being the TPC (S118).

According to the second determining method, the mode switchover determining unit 822 retains the results of the CQI checks conducted n-times in the past with respect to each mobile terminal, and determines the mode switchover based on statistics of the results of the CQI checks conducted n-times in the past. To begin with, the mode switchover determining unit 822, when receiving the information on the communication method applied at the present to the target mobile terminal from the high-order layer function unit 810, switches over the determination technique corresponding to the present communication method (S121).

The mode switchover determining unit 822, if the present communication method is the AMC, determines the mode switchover as below (S121; AMC).

The mode switchover determining unit 822, when determining as the result of the CQI check that the valid CQI value does not exist (S122; NO), takes the statistics of the results of the CQI checks conducted n-times in the past in a way that includes the result of the CQI check of this time (S125). Through this operation, the mode switchover determining unit 822, when determining m-times or more that the valid CQI value does not exist (S125; YES), determines the mode switchover from the AMC method to the TPC method for the communications with the mobile terminal (S127). The mode switchover determining unit 822 transmits the mode switchover information and the TPC control bits to the high-order layer function unit 810 (S128).

While on the other hand, the mode switchover determining unit 822, if it is not determined m-times or more that the valid CQI value does not exist (S125; NO), determines that the AMC method is continuously applied to the communications with the mobile terminal (S123). In this case, the mode switchover determining unit 822 sets the CQI value transmitted to the high-order layer function unit 810 to a value of the minimum level (CQI=63 in FIG. 3) of the MCS Set (S126). The mode switchover determining unit 822 transmits the CQI value, which is set to the value of the minimum level of the MCS Set, to the high-order layer function unit 810 (S124).

Further, the mode switchover determining unit 822 similarly determines, also when determining as the result of the CQI check that the valid CQI value exists (S122; YES), that the AMC method is continuously applied to the communications with the mobile terminal (S123). In this case, the mode switchover determining unit 822 transmits the CQI value sent from the threshold monitor unit 823 to the high-order layer function unit 810 (S124).

Next, the mode switchover determining unit 822, if the present communication method is the TPC method, determines the mode switchover as follows (S121; TPC).

The mode switchover determining unit 822, when determining as the result of the CQI check that the valid CQI value exists (S131; YES), takes the statistics of the results of the CQI checks conducted n-times in the past in a way that includes the result of the CQI check of this time (S135). Through this operation, the mode switchover determining unit 822, if it is not determined m-times or more that the valid CQI value does not exist (S125; NO), determines the mode switchover from the TPC method to the AMC method for the communications with the mobile terminal (S136). In this case, the mode switchover determining unit 822 transmits the mode switchover information and the CQI information to the high-order layer function unit 810 (S137).

While on the other hand, the mode switchover determining unit 822, when determining m-times or more that the valid CQI value does not exist (S125; YES), determines that the TPC method is continuously applied to the communications with the mobile terminal (S132). Further, the mode switchover determining unit 822 similarly determines, also when determining as the result of the CQI check that the valid CQI value does not exist (S131; NO), that the TPC method is continuously applied to the communications with the mobile terminal (S132). In this case, the mode switchover determining unit 822 transmits the TPC control bits to the high-order layer function unit 810 (S133).

Note that the flowcharts in FIGS. 12 and 13 show the case of making use of one statistic threshold value m for determining the mode switchover, however, the statistic threshold value may also be switched over depending on the communication method applied at the present. For example, it may be determined whether a non-existence count of the valid CQI value is equal to or larger than m-times if the communication method applied at the present is the AMC, and it may also be determined whether the non-existence count of the valid CQI value is equal to or larger than p-times ($p<m$) if the communication method applied at the present is the TPC.

According to the third determining method, the mode switchover determining unit 822 receives only the CQI value from the threshold monitor unit 823 (S101), receives the result of the data determination from the data determining unit 816 (S141), and determines the mode switchover in the following manner. In the third determining method, the mode switchover determining unit 822 does not make use of the result of the CQI check by the threshold monitor unit 823. The third determining method is carried out when the communication method applied at the present is the AMC method.

The mode switchover determining unit 822 retains the results of the data determination conducted n-times in the past with respect to each mobile terminal. Then, the mode switchover determining unit 822 takes the statistics of the results of the data determination conducted n-times in the past in a way that includes the result of the data determination of this time (S142). Through this operation, the mode switchover determining unit 822, if it is not determined m-times or more that an ACK status occurs (the received data is normal) (S142; NO), determines that there should be executed the mode switchover from the AMC method to the TPC method for the communications with the mobile terminal (S144). The mode switchover determining unit 822 transmits the mode switchover information and the TPC control bits to the high-order layer function unit 810 (S145).

Whereas if it is determined m-times or more that the ACK status occurs (the received data is normal) (S142; YES), the mode switchover determining unit 822 determines that the AMC method is continuously applied to the communications with the mobile terminal (S146). The mode switchover determining unit 822 sends the CQI value to the high-order layer function unit 810 (S147).

Figure 15:
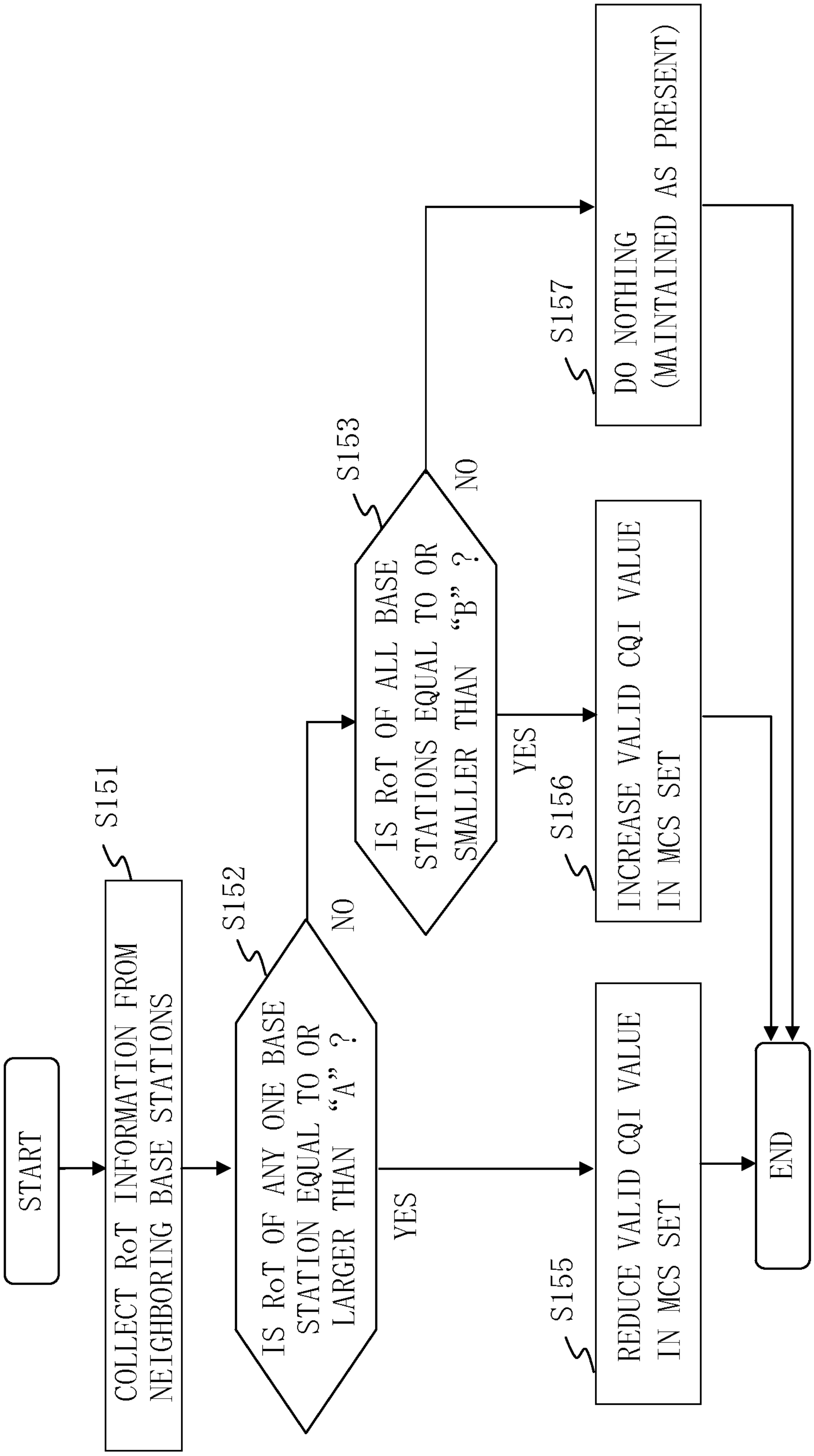
FIG. 15 is a diagram illustrating an operational example of a first automatic optimization method of the MCS Set.
Figure 16:
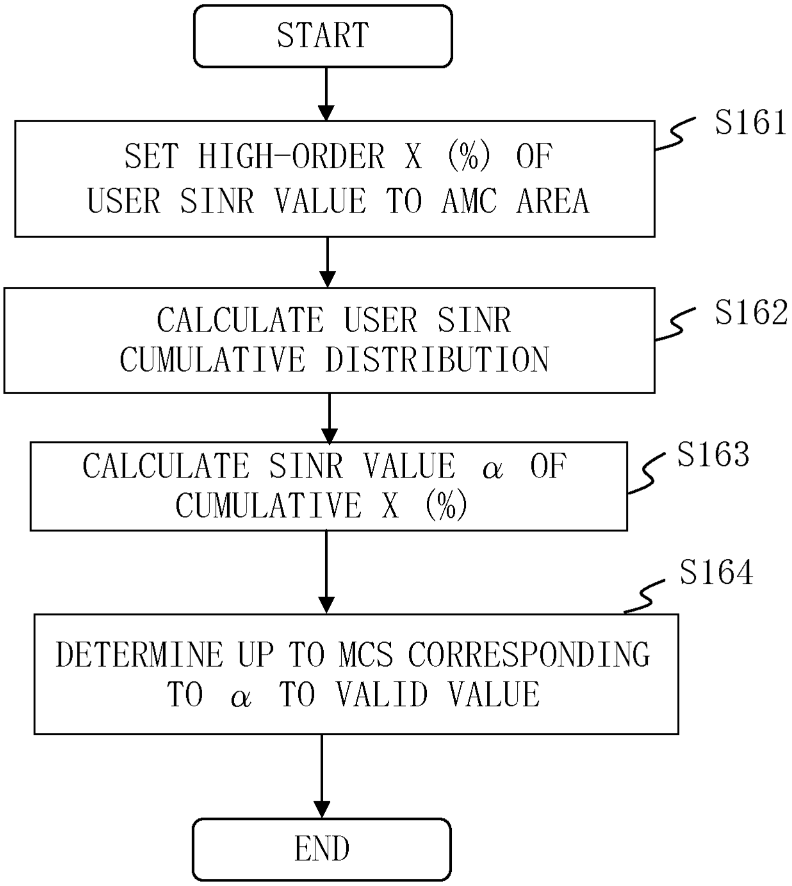
FIG. 16 is a diagram illustrating an operational example of a second automatic optimization method of the MCS Set.

Next, an operation, by which the threshold monitor unit 823 automatically optimizes the MCS Set, will hereinafter be described with reference to FIGS. 15 and 16. Two methods are each exemplified as a technique by which the threshold monitor unit 823 automatically optimizes the MCS Set. FIG. 15 is a flowchart illustrating an operation of a first automatic optimization technique of the MCS Set by the threshold monitor unit 823, and FIG. 16 is a flowchart illustrating an operation of a second automatic optimization technique of the MCS Set by the threshold monitor unit 823.

The first automatic optimization technique of the MCS Set is executed as follows.

The high-order layer function unit 810 of the base station 1 collects pieces of RoT (Rise over Thermal) information from the neighboring base stations (the base stations 1-1 through 1-6 in the example of FIG. 9) (S151). The high-order layer function unit 810 transmits the collected pieces of RoT information to the threshold monitor unit 823.

The threshold monitor unit 823 determines whether any one RoT of the acquired RoT information of the respective neighboring base stations is equal to or larger than a predetermined threshold value A (S152). The threshold monitor unit 823, when determining that any one RoT is equal to or larger than the predetermined threshold value A (S152; YES), reduces the valid CQI value within the MCS Set (S155). To be specific, a predetermined number of records counted from the lowest level of record (the record containing the largest CQI value) of the MCS Set shown in FIG. 3 are invalidated (S155). The predetermined number of records to be invalidated may also be retained adjustably in the memory etc.

While on the other hand, the threshold monitor unit 823, when determining that none of the acquired RoT information of the neighboring base stations is equal to or larger than the predetermined threshold value A (S152; NO), determines whether all the RoT information is equal to or smaller than a threshold value B (S153). The threshold monitor unit 823, when determining that all the RoT information is equal to or smaller than the threshold value B (S153; YES), increments the valid CQI value in the MCS Set (S156). Specifically, a predetermined number of records counted from the highest level of record (the record containing the smallest CQI value) in the invalidated records of the MCS Set shown in FIG. 3 are validated (S156). The predetermined number of records to be validated may also be retained adjustably in the memory etc.

The threshold monitor unit 823, when determining that all the RoT information is not equal to or smaller than the threshold value B (S153; NO), does not update the MCS Set (S157). Note that deleting the valid CQI value intends to reduce the interference under the transmit power control with transition from the AMC mode to the TPC mode by raising the minimum transmission rate usable in the AMC mode. Reversely, incrementing the valid CQI value intends to increase a system throughput with the transition to the AMC mode from the TPC mode by decreasing the minimum transmission rate usable in the AMC mode.

Next, the operation of the second automatic optimization technique of the MCS Set will be explained.

The high-order layer function unit 810 of the base station 1 automatically optimizes the MCS Set by use of the statistics of the SINR values about the individual mobile terminals within the self-station. The high-order layer function unit 810 sets so that the AMC method is applied to high-quality high-order value X (%) in the SINR values about the individual mobile terminals within the self-station (S161). The high-order layer function unit 810 determines this value-of-ratio X (%) so that the system throughput gets approximate to a target value.

The high-order layer function unit 810 gets the scheduler (unillustrated), which statistically processes the propagation information of each individual user, to calculate an SINR cumulative distribution (S162). The high-order layer function unit 810 calculates an SINR value α defined as a threshold value of the quality high-order value X (%) in order for the quality high-order value X (%) of the calculated cumulative distribution to become the AMC area (S163). The high-order layer function unit 810 sends the SINR value α to the threshold monitor unit 823.

The threshold monitor unit 823 acquires the threshold CQI corresponding to the SINR value α, and invalidates the record, of which the quality is worse than the threshold CQI, of the MCS Set. The TPC method is thereby applied to the communications with the mobile terminal indicating to be equal to or lower than the threshold CQI.

Note that the value-of-ratio X (%) set by the high-order layer function unit 810 may also be determined in a way that transfers and receives a traffic status etc to and from the peripheral base stations. In this case, for example, the control is conducted so that the value-of-ratio X of the base station on which the traffic is concentrated is set high, while the value-of-ratio X of the base station on which the traffic is not concentrated is set low.

[Operation and Effect of First Embodiment]

Herein, an operation and an effect of the mobile communication system in the first embodiment discussed above will be described.

Each of the base stations configuring the mobile communication system in the first embodiment organizes the dedicated control channels in a way that distinguishes between the selection control information channel in which to allocate the control information for the AMC and TPC (selection control information) and the general control information channel in which to allocate the control information other than the above. The base station 1 according to the first embodiment sets the AMC area narrower than the entire cell domain by transmitting the control information for the AMC (SINR notification) without conducting “Repetition”. This is because the control information for the AMC has a larger quantity of information (larger data size) than by other communication methods such as the TPC.

This scheme enables the quantity of the control information for the AMC to be reduced, and the wireless resources for transmitting the user data can be effectively used by utilizing the reduced area for transmitting the user data. Further, the bits themselves of the control information for the AMC themselves can be decreased because of no necessity for covering the MCS Set up to the cell edge.

Hence, according to the first embodiment, the AMC can be applied while improving the frequency-utilization efficiency, and the fast communications can be therefore realized.

Further, in the base station 1 according to the first embodiment, the TPC is applied to the areas other than the AMC area within the cell domain. The TPC has a less quantity of control information than the AMC has, and it is therefore hard to consider that the control information comes to be in large quantity even by performing “Repetition” in order to cover up to the vicinity of the cell edge.

This scheme enables, in the TPC area, the transmission power to be reduced while ensuring further the fixed communication rate with improving the frequency-utilization efficiency by deleting the control information for the AMC. The quantity of the interference with the neighboring cells can be thereby reduced.

The base station 1 in the first embodiment determines whether the mobile terminal within the self-station exists in the AMC area or not, and hence it is determined by referring to the MCS Set whether the SINR value estimated from the pilot signal transmitted from the mobile terminal corresponds to the valid CQI value or not.

Thus, if the mobile terminal exists in such a level of propagation environment as to be disabled from normally receiving the control information for the AMC, the AMC method is not applied. Namely, the area (the AMC area or the TPC area) where each mobile terminal in the self-station exists can be properly determined.

Figure 17:
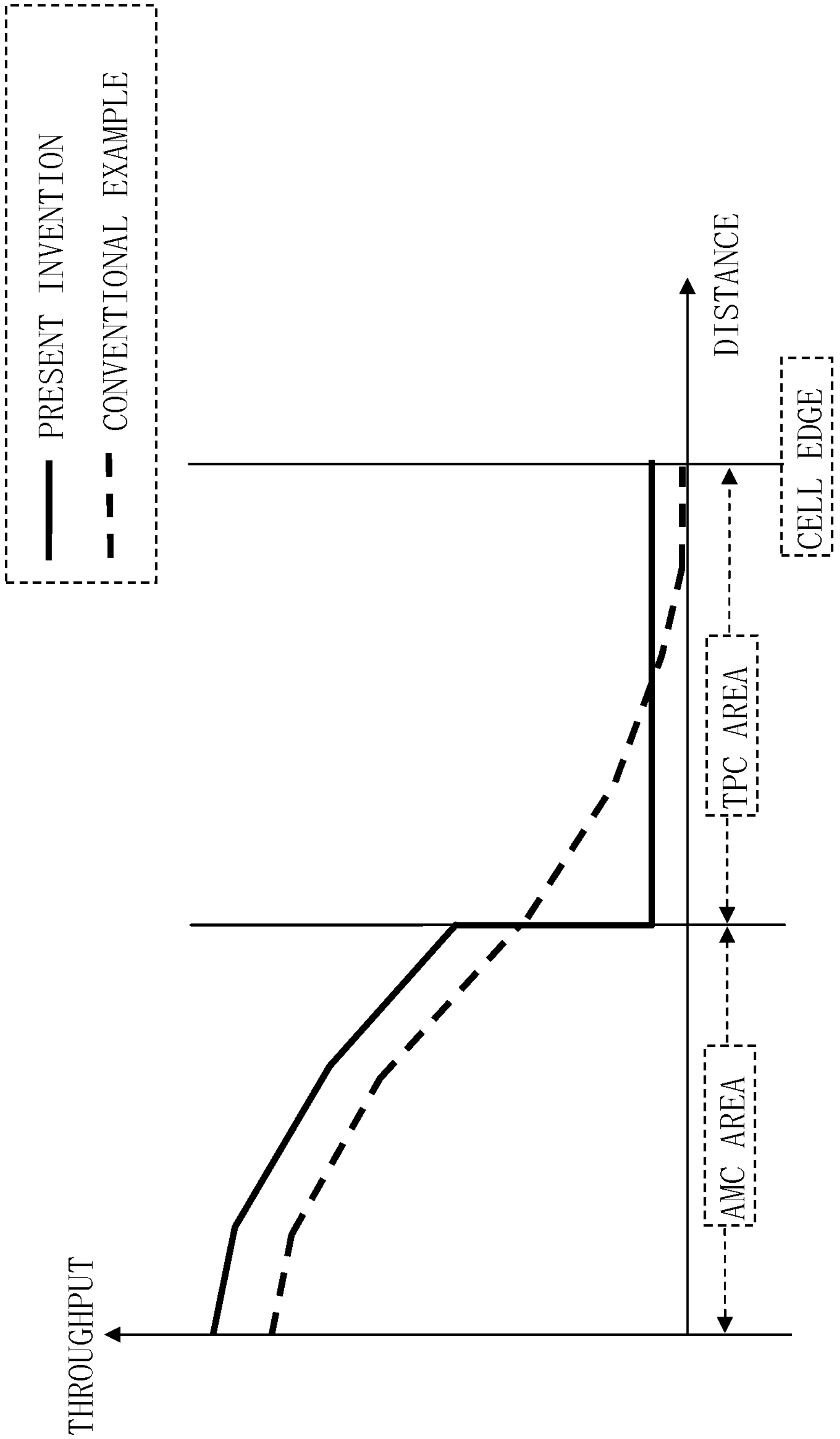
FIG. 17 is a diagram illustrating communication characteristics (throughputs) in a conventional system and the mobile communication system in the first embodiment.
Figure 18:
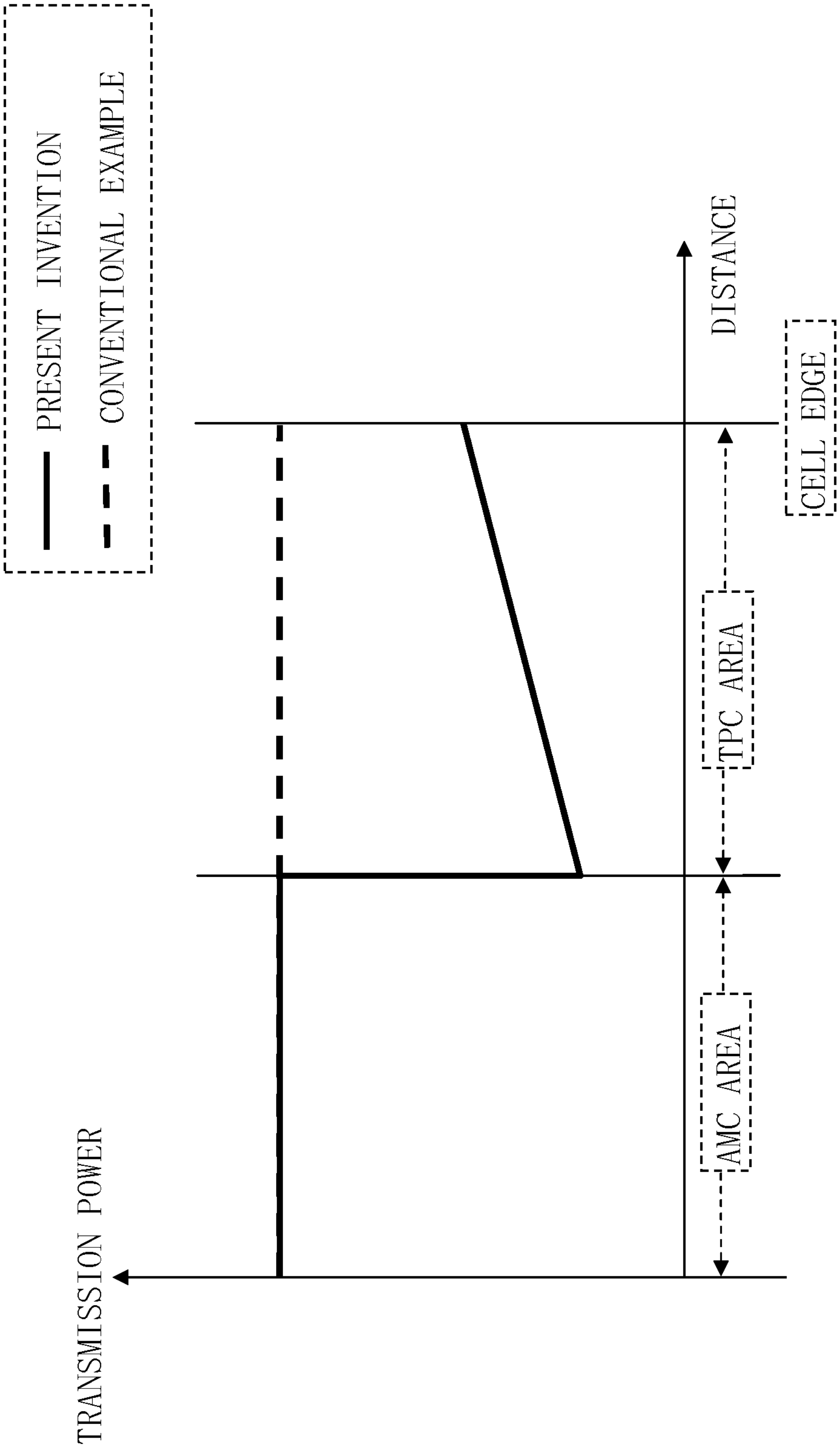
FIG. 18 is a diagram illustrating communication characteristics (transmission power) in the conventional system and the mobile communication system in the first embodiment.

FIGS. 17 and 18 are graphs each illustrating communication characteristics (the throughput and the transmission power) in the conventional system and the mobile communication system according to the first embodiment. In FIGS. 17 and 18, the solid line represents the communication characteristics of the mobile communication system in the first embodiment, while the broken line indicates the communication characteristics of the conventional system.

According to FIG. 17, the transmission rate of the user data can be increased by reducing the control information for the AMC, and therefore the throughput in the AMC area can be more improved by the system of the first embodiment than by the conventional system. Further, the AMC is not applied in the TPC area, and hence, though the throughput becomes lower than in the example of the conventional art, the reduction in the quantity of the interference with the neighboring cells can be attained by the TPC as well as reducing the control information for the AMC, whereby the system in the first embodiment gains more improved throughput in the vicinity of the cell edge than by the conventional system.

According to FIG. 18, the AMC is applied in the whole cell domain in the conventional system, and hence, though the transmission power is substantially fixed, the system in the first embodiment enables the transmission power to be reduced in the TPC area.

[First Modified Example]

In the base station 1 according to the first embodiment discussed above, as shown in the operational example in FIG. 10, such a communication sequence is executed that the high-order layer function unit 810, when detecting the occurrence of the mode switchover, determines the post-mode-switchover communication format of the control signal, which is transmitted via the dedicated control channel for the target mobile terminal, and shares the recognition of the communication mode switchover with the mobile terminal by signaling. Namely, the mobile communication system in the first embodiment continues the communications based on the pre-switchover communication method till the switchover of the communication mode is recognized through signaling.

Figure 19:
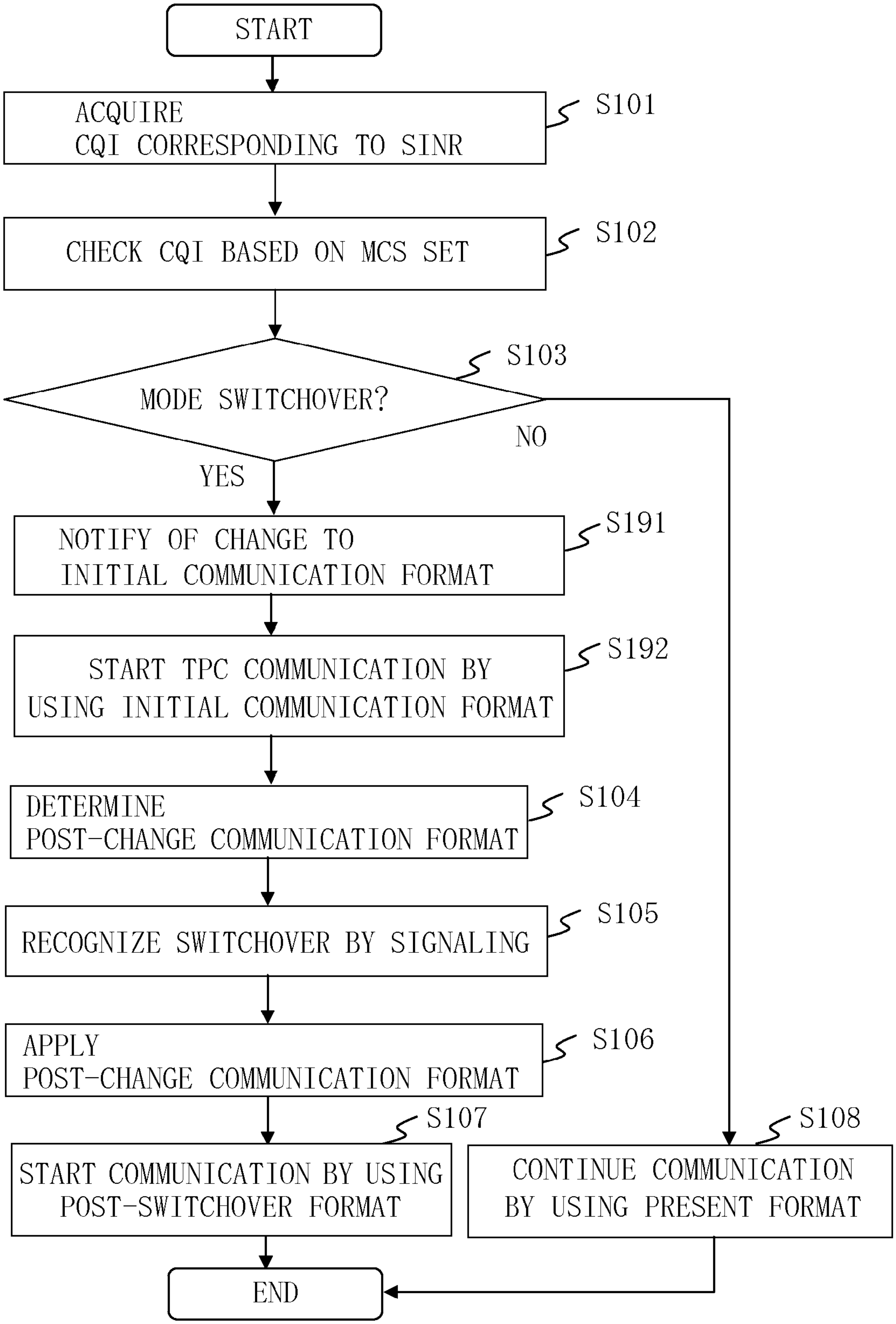
FIG. 19 is a diagram illustrating an outline of the operation of determining the communication method (switchover mode) of the base station in a first modified example.

In a first modified example which will hereinafter be described, before the switchover of the communication mode is recognized through signaling, the forced switchover to the TPC method is started as a temporary measure. According to the first modified example, a restraint of the interference can be actualized by performing the prompt switchover to the proper communication method. Note that the first modified example is a technique suited to the switchover to the TPC area from the AMC area. FIG. 19 is a flowchart illustrating an outline of operation of determining the communication method (switchover mode) of the base station 1 in the first modified example.

As shown in FIG. 19, the high-order layer function unit 810, if it is determined that the mode switchover occurs (S103; YES), notifies the target mobile terminal of a purport of transitioning to a temporary TPC communication mode through the control signal (S191). This notification may be realized by providing a bit showing a purport thereof in a predetermined field of the control signal illustrated in FIGS. 5, 6 and 7.

The communication format (the modulation method, the coding method, etc) in the temporary TPC communication mode is assumed to be already known by the base station and the mobile terminal. With this contrivance, the mobile terminal receiving the notification hereinafter performs the TPC communications by use of the already-known communication format (S192). The high-order layer function unit 810 of the base station 1, during the communications in the temporary TPC communication mode, determines the adequate communication format after the mode switchover as in the first embodiment discussed above (S104), and conducts the control of applying the determined communication format (S106, S107).

[Second Modified Example]

In the mobile terminals 2 and 3 in the first embodiment discussed above, if the communication method is determined to be the TPC, the fixed modulation method and coding method are sent to the fixed rate setting unit 414, and the coding-and-modulating unit 415 executes the modulation and coding, corresponding thereto.

A second modified example is that the base station 1 adaptively adjusts the communication rate also in the TPC area. The base station 1 in the second modified example, which previously sets the target power, carries out the control of increasing the communication rate via the high-order layer function unit 810 if the transmission power is well lower than the target power, and decreasing the communication rate via the high-order layer function unit 810 if the transmission power is well higher than the target power.

Figure 20:
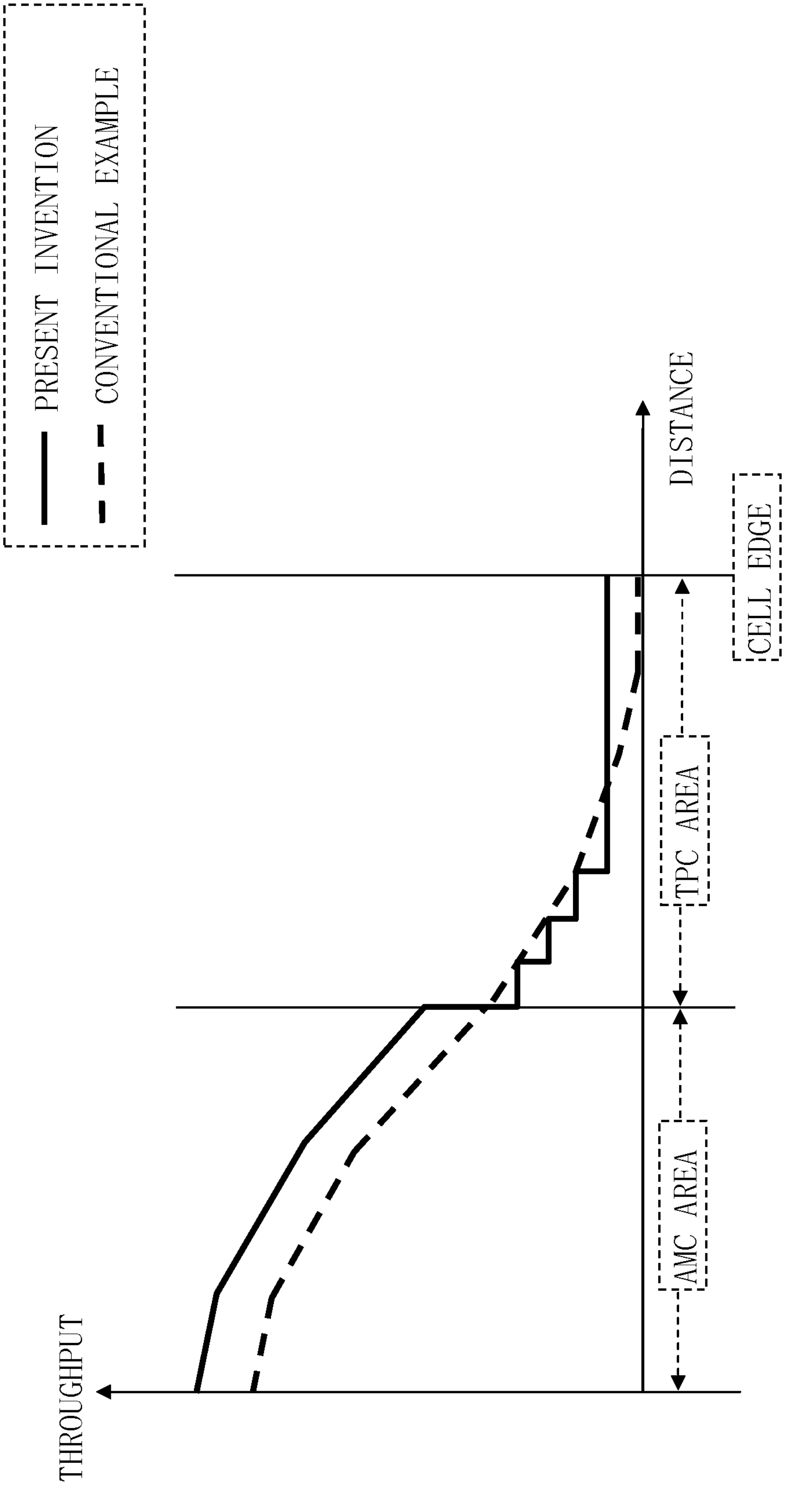
FIG. 20 is a diagram illustrating the communication characteristic (throughput) in the mobile communication system in a second modified example.

FIG. 20 is a graph illustrating the communication characteristic (throughput) in the mobile communication system in the second modified example. With respect to the area inferior to the conventional system in terms of the throughput in the TPC area as illustrated in FIG. 17 according to the first embodiment, the second modified example has a scheme enabling the throughput to be improved by combining conversion of the communication rate with the TPC.

[Second Embodiment]

Next, the mobile communication system in a second embodiment of the present invention will hereinafter be described. The base station 1 in the first embodiment discussed above provides the AMC area in the vicinity of the base station and the TPC area outside the AMC area. The base station 1 in the second embodiment further provides an area (which will hereinafter be referred to as a MIMO area) in which MIMO (Multi Input Multi Output) is executed inwardly of the AMC area. The following discussion will be focused on only different devices and different function units from those in the first embodiment, and the explanations of the same devices and the functions units as those in the first embodiment are omitted.

[System Architecture and Principle]

Figure 21:
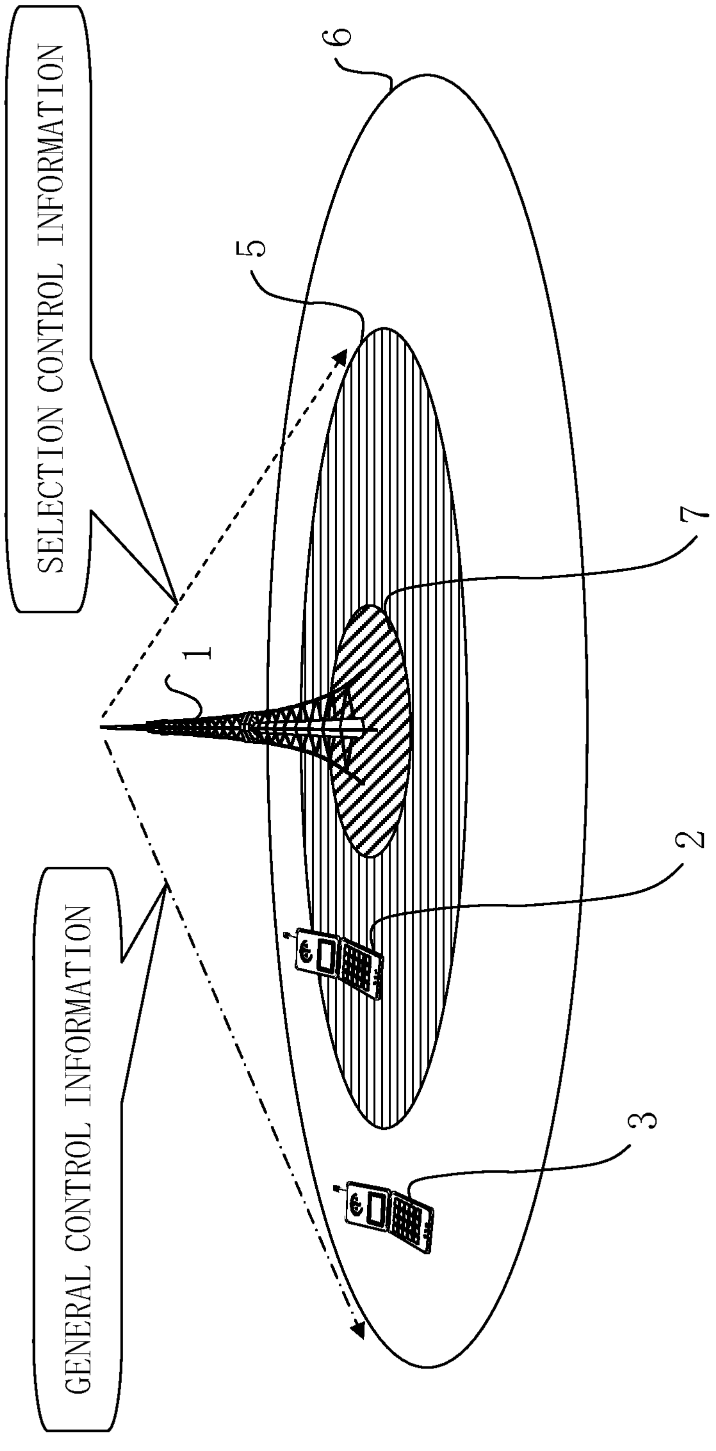
FIG. 21 is a diagram illustrating a system architecture of the mobile communication system in a second embodiment.

FIG. 21 is a block diagram illustrating a system architecture of the mobile communication system in the second embodiment. The mobile communication system in the second embodiment has the same system architecture as in the first embodiment. The base station 1 is, however, as illustrated in FIG. 21, different from the base station 1 in the first embodiment in terms of providing a MIMO area 7 within the cell configured by itself.

The base station 1 in the second embodiment manages the MCS Set shown in FIG. 22. The MIMO area is applied to the CQI having the high quality level. An example in FIG. 22 shows 2-stream MIMO, however, the present invention does not limit the number of streams. Further, the valid CQI value is set up to "31" in the same way as the MCS Set (see FIG. 3) utilized in the first embodiment, however, the second embodiment may take a scheme of increasing the valid CQI value by expanding the AMC area. In this case, "Repetition" applied to the control information for the AMC (the SINR notification) may be increased.

[Configuration of Device]

In the mobile communication system according to the second embodiment, the functions of the mobile terminal serving as a transmitting station are different from those in the first embodiment. A functional configuration of the mobile terminal in the second embodiment will hereinafter be described in a way that puts a focus on functions different from those in the first embodiment. Incidentally, the explanations of the same function units as those in the first embodiment are omitted.

<Mobile Terminal>

Figure 23:
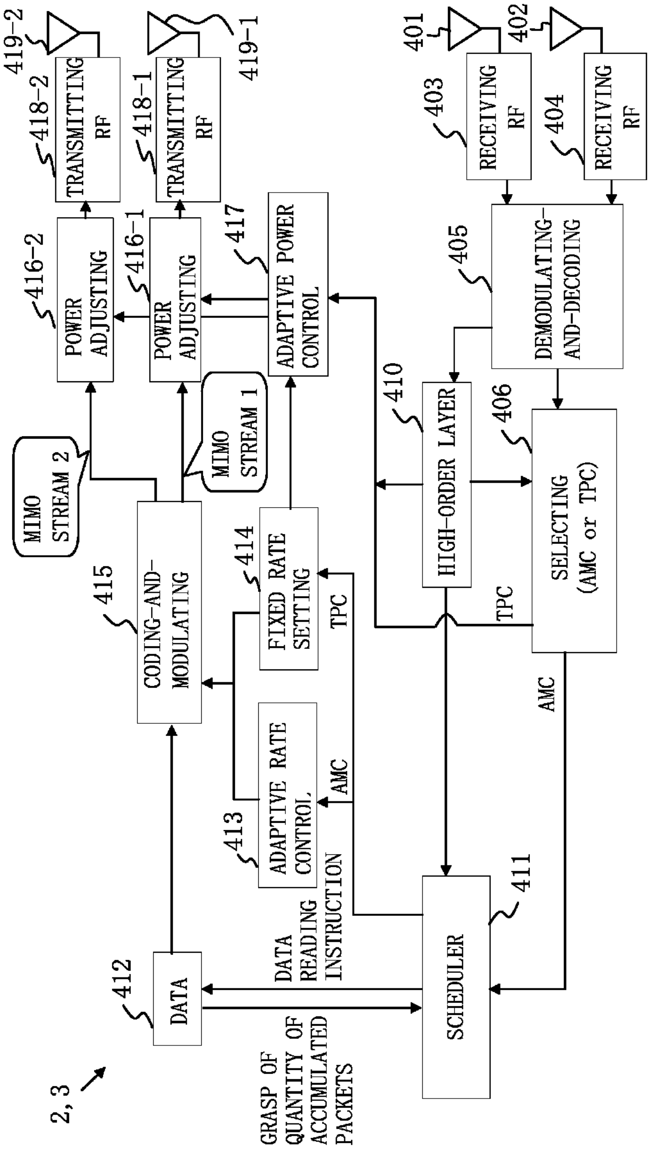
FIG. 23 is a diagram illustrating a functional configuration of the mobile terminal as a transmitting station in the second embodiment.
Figure 24:
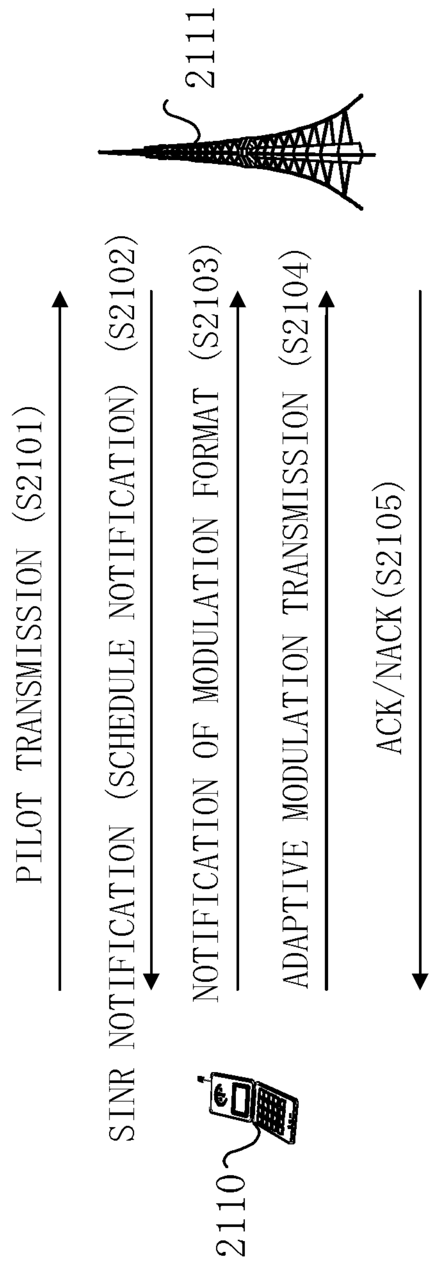
FIG. 24 is a diagram illustrating a communication sequence for executing the AMC between the mobile terminal and the base station.

FIG. 23 illustrates the functional configuration of each of the mobile terminals 2 and 3 serving as the transmitting stations in the second embodiment. A difference from the mobile terminal in the first embodiment is that two MIMO streams are provided, whereby the power adjusting units, the transmitting units and the transmitting antennas are provided by twos corresponding thereto.

The high-order layer function unit 410 or the scheduler 411 determines that the MIMO communications should be performed based on the control information (SINR notification information) output from the demodulating-and-decoding unit 405. For example, if a large quantity of packets are accumulated in the transmission packet queue 412 in such a case that the SINR notification information exhibits a high communication quality, a MIMO multiplexing communication is selected. At this time, the transmission packets for the 2 streams are read out from the transmission packet queue 412, and the adaptive modulation and coding is executed corresponding to each MIMO stream. The thus-acquired stream signals are set to the maximum power by power adjusting units 416-1 and 416-2 and are, after being up-converted into radio frequencies by respective transmitting units 418-1 and 418-2, radiated from individual transmitting antennas 419-1 and 419-2.

[Operation and Effect of Second Embodiment]

In the mobile communication system in the second embodiment discussed above, the MIMO multiplexing communication is applied in the area having the preferable communication status. With this scheme, the AMC is applied in the vicinity of the base station 1 as well as the MIMO multiplex communication being applied, and hence the faster communications than in the first embodiment are actualized.

<Note>

The embodiments discussed above further disclose Notes which follow.

(Note 1) A base station device forming a cell and performing wireless communication with a mobile terminal being present in the cell, comprising:

a determining unit configured to determine application of adaptive modulation and coding to only the wireless communication with a mobile terminal being present in a predetermined area of a part of the cell and for determining application of transmit power control to the wireless communication with a mobile terminal being present in a cell area outside the predetermined area.

(Note 2) A base station device according to Note 1, wherein the determining unit determines to apply a MIMO (Multiple Input Multiple Output) communication to the wireless communication with the mobile terminal being present in a second predetermined area of a part of the predetermined area in combination.

(Note 3) A mobile terminal performing wireless communication with a base station forming a cell, comprising:

a signal processing unit configured to execute adaptive modulation and coding for the wireless communication with the base station only when being present in a predetermined area of a part of the cell.

(Note 4) A mobile terminal according to Note 3, wherein the signal processing unit executes transmit power control for the wireless communication with the base station when being present in a cell area outside the predetermined area.

(Note 5) A mobile communication system comprising:

a base station forming a cell; and a mobile terminal performing wireless communication with the base station, the base station including a determining unit configured to determine application of adaptive modulation and coding to only the wireless communication with the mobile terminal being present in a predetermined area of a part of the cell, the mobile terminal including a signal processing unit configured to execute adaptive modulation and coding for the wireless communication with the base station only when being present in the predetermined area.

(Note 6) A mobile communication system according to Note 5, wherein the determining unit of the base station determines application of transmit power control to the wireless communication with the mobile terminal being present in a cell area outside the predetermined area, and the signal processing unit of the mobile terminal executes transmit power control for the wireless communication with the base station when being present in the cell area outside the predetermined area.

What is claimed is:

1. A base station device forming a cell and performing wireless communication with a mobile terminal being present in the cell, comprising:

a determining unit configured to determine application of adaptive modulation and coding to only the wireless communication with a mobile terminal being present in a predetermined area of a part of the cell, wherein the determining unit has a Modulation and Coding Scheme (MCS) Set corresponding to a valid range of Channel Quality Indicator (CQI) values;

a control signal generating unit configured to make redundancy of control information used for the adaptive modulation and coding smaller than redundancy of other control information and to adaptively set a redundancy of control information used for the adaptive modulation and coding depending on the valid range of the CQI values corresponding to the MCS Set;

a changing unit configured to change the range of the valid CQI values based on interference information collected from at least one of peripheral base station devices other than a module terminal; and a format changing unit configured to change, if the determining unit does not determine the application of the adaptive modulation and coding, a format to a communication format in which user data is allocated in place of the control information used for the adaptive modulation and coding.

* * * * *